US007246086B2

(12) United States Patent
Araki et al.

(10) Patent No.: US 7,246,086 B2
(45) Date of Patent: Jul. 17, 2007

(54) PRODUCT INFORMATION MANAGEMENT DEVICE

(75) Inventors: Kiyoshi Araki, Tokyo (JP); Shigeo Yamamoto, Yokohama (JP); Haruki Horikawa, Urayasu (JP); Satoshi Kawata, Tokyo (JP); Kayoko Maruta, Tokyo (JP); Masumi Okada, Hirakata (JP); Kenichi Murata, Suita (JP); Masayo Takemoto, Toyonaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 136 days.

(21) Appl. No.: 10/274,050

(22) Filed: Oct. 21, 2002

(65) Prior Publication Data

US 2003/0083962 A1 May 1, 2003

(30) Foreign Application Priority Data

Oct. 26, 2001 (JP) .............................. 2001-330053

(51) Int. Cl.
*G06Q 30/00* (2006.01)

(52) U.S. Cl. .............................. 705/26; 705/1; 705/10; 705/16; 705/27; 705/35; 707/10; 709/217; 715/513

(58) Field of Classification Search ................. 705/26, 705/27, 34, 40, 30, 1, 10, 16, 35; 707/10, 707/100, 102, 104; 709/202, 203, 217, 219, 709/223, 224; 715/513
See application file for complete search history.

(56) References Cited

U.S. PATENT DOCUMENTS 5,893,098 A * 4/1999 Peters et al. ................. 707/10

| | | | |
|---|---|---|---|
| 6,473,740 B2* | 10/2002 | Cockrill et al. ............... 705/27 |
| 6,473,794 B1* | 10/2002 | Guheen et al. ............. 709/223 |
| 6,516,337 B1* | 2/2003 | Tripp et al. .................. 709/202 |
| 6,519,571 B1* | 2/2003 | Guheen et al. ............... 705/14 |
| 6,594,692 B1* | 7/2003 | Reisman ..................... 709/219 |
| 6,601,057 B1* | 7/2003 | Underwood et al. ........... 707/1 |
| 6,853,982 B2* | 2/2005 | Smith et al. .................. 705/27 |
| 2001/0047290 A1* | 11/2001 | Petras et al. .................. 705/10 |
| 2001/0053980 A1* | 12/2001 | Suliman et al. ................ 705/1 |
| 2002/0010619 A1* | 1/2002 | Noborimoto et al. ......... 705/10 |
| 2002/0091581 A1* | 7/2002 | Kudou ........................ 705/26 |
| 2005/0144036 A1* | 6/2005 | Bell et al. ...................... 705/1 |

FOREIGN PATENT DOCUMENTS

JP 11-161602 6/1999

OTHER PUBLICATIONS

The website "Filipina.com" dating to Dec. 23, 1996.*

* cited by examiner

*Primary Examiner*—Yogesh C. Garg
(74) *Attorney, Agent, or Firm*—Wenderoth, Lind & Ponack, L.L.P.

(57) ABSTRACT

A My Page management server is a server that provides a personal world wide web (WWW) page named My Page for a user who has been registered as a member. The My Page management server includes a product registration unit that acquires information of a product which the user purchased, a link generation unit that generates, on the My Page, a link indicator which is linked to a product questionnaire about the product which the user purchased, based on the acquired information of the product, and a product questionnaire management unit that presents the linked product questionnaire to the user upon receiving a request for the product questionnaire from the user.

2 Claims, 25 Drawing Sheets

Fig. 7

| | | |
|---|---|---|
| 1501 — system user ID | S72168716 | |
| 1520 — questionnaire ID | A37341556 | |

2000

| | | |
|---|---|---|
| 1501 — system user ID | S00000001 | |
| 1520 — questionnaire ID | A00000004 | |

| | | |
|---|---|---|
| 1501 — system user ID | S00000001 | |
| 1520 — questionnaire ID | A00000001 | |
| 1901 — questionnaire question number | 001 | |
| 2001 — questionnaire answer number | 2, 3 | ("startup time", "size/weight") |
| 1901 — questionnaire question number | 002 | |
| 2001 — questionnaire answer number | 1, 2 | ("my pet", "travel") |
| 1901 — questionnaire question number | 003 | |
| 2001 — questionnaire answer number | 6 | (voice recording) |
| 2002 — answer completion flag | 1 | |
| 2003 — questionnaire answer date | 20020403 | |

Fig. 15

Membership Registration

Please fill in all the items with ⊘ mark attached.

- ⊘ Name: Yukari  Koara
- ⊘ Sex: ○ Male  ⦿ Female
- ⊘ Birth date: 1964 ▾ year  1 ▾ month  1 ▾ day
- ⊘ Address:  Zip code
  540 – 6209
  Address (Search from zip code (Search))
  Duo Apartment 2001, 1-1, Shiromi 2, Chuo-ku, Osaka
- ⊘ Occupation: Company executive ▾
- ○ Industry: Forestry ▾
- ⊘ Hobby: Tree-climbing ▾
- ⊘ User ID: KOARAEWA
- ⊘ Password: ********

[ Send ]  [ Reset ]

Fig. 20

Product Questionnaire on DVD-RAM — 901

Thank you very much for your purchase of our DVD-RAM. We would like to develop our new products based on your answer to the following questionnaire.

Q1 Usage type — 902

○ corporate use    ● personal use

Q2 Major intended use (check all that apply)

● business use         ○ personal use
○ data storage        ○ data storage
  (motion picture)       (still picture)
○ data storage        ● data storage
  (music)                (general)

— 903

☆ Please answer the next question if you answered "business use" in Q2. — 904

Q3 Industry

○ government and public office  ● service
○ distribution  ○ freelance  ○ manufacturing
○ secret garden  ○ school  ○ medicine and health care
○ computer  ○ others [         ]

— 905

Many thanks for your time and help!

[Return (Cancel)]   [Store and return]   [Reset]
      909                  910              907
              [Send]
               908

Product Questionnaire on Digital Camera — 1301

Thank you very much for your purchase of our digital camera. We would like to develop our new products based on your answer to the following questionnaire.

Q1  What is your complaint in using the product?
(One or more)
- ○ image quality  ● startup time  ● size/weight
- ○ operability  ○ design  ○ color
- ○ LCD  ○ instruction manual
- ○ others  [            ]

— 1302

Q2  What do you want to shoot? (One or more)
- ● my pet  ● travel  ○ sports
- ○ commemorative photo (wedding ceremony, etc.)
- ○ others  [            ]

— 1303

Q3  Do you need any other function? (One or more)
- ○ zoom  ○ fully automatic  ○ serial shooting
- ○ connection to cellular phone
- ○ shooting motion video  ● voice recording
- ○ nothing  ○ others  [            ]

— 1304

Many thanks for your time and help!

[Return (Cancel)] — 909  [Store and return] — 910  [Reset] — 907

[Send] — 908

| | | |
|---|---|---|
| 1601 — product code (product number) | | VBM-D05 |
| 1601 — product code (product number) | | DMC-F13 |

| | |
|---|---|
| 1601 — product code (product number) | DMC-F7 |
| 2301 — product name | XXXXXX |
| 2302 — product type | "digital still camera" |
| 2303 — publicity date | 20020205 |
| 2304 — expected release date | 20020301 |
| 2305 — production ending date | to be determined |
| 2306 — sale ending date | to be determined |
| 2307 — product catch phrase | "colorful and clear" |
| 2308 — product description | "5-color option ..." |
| 2309 — image | DMC-F7.jpg |
| 2310 — product size | 104X 50.9X 31.6mm |
| 2311 — price | open |
| 1520 — questionnaire ID | A00000001 |
| 2401 — questionnaire ID | A10861616 |
| 2312 — registration date | 20020201 |
| 2313 — last update date | 20020302 |

2400

PRODUCT INFORMATION MANAGEMENT DEVICE

BACKGROUND OF THE INVENTION (1) Field of the Invention

The present invention relates to a product information management device that collects and manages information of products sold to users.

(2) Description of the Related Art

In recent years, with diversified product needs, development of a product reflecting customers' needs has been desired. A postcard for user registration including some questionnaire items has been enclosed in a package of a product for sale. The user fills in his personal data such as his address and name, answers the questionnaire items such as his purchase motive and his request for the product, and sends the postcard back to the company. Thus, the company which sells the product can obtain a certain amount of information about the product from the user.

However, as a general rule, since the user registers soon after he purchased the product, the contents of the questionnaire that the user can answer at the time of the user registration are limited, of course. For the product developer side, the product purchase motive or the user's request for the product before its use is important information. However, the user's impressions and requests obtained after the product has been used for a while, such as the availability, usability or problems of the product, are much more important information.

On the other hand, for the user, it is bothersome to fill in the answers to the questionnaire on a limited space of the postcard in addition to his personal data such as his address, name, age, sex and telephone number. Also, if the questionnaire includes some items which can be filled in only after the product has been used for a while, the user has to keep the postcard for the user registration until he comes to feel that he has made full use of the product. As a result, although the user is willing to answer the questionnaire, he may have lost the postcard or thrown it away together with the package while he is using the product. Accordingly, he cannot answer the questionnaire in many cases.

Under the circumstances, a lot of companies accept the user registration online as needed on their world-wide web (WWW) sites on the Internet, so that the user does not need to keep the postcard for the user registration but can register just by filling in the answers one after another on the user registration screen which is linked to the WWW page of the company and displayed. However, even in this case, if the questionnaire is included in this user registration screen, the user has to answer the questionnaire as well as input his personal data such as his name, address, age, sex and telephone number accurately. It takes much attention and time for the user registration. Even if the questionnaire is separated from the user registration, a lot of questionnaire e-mails may be sent to the user's e-mail address. However, neither case is convenient to the user, nor user-friendly, and this is a problem.

SUMMARY OF THE INVENTION

Accordingly, the object of the present invention is to provide a product information management device that can present a WWW page for a product questionnaire which is user-friendly and thus easy for the company to collect the product information.

In order to achieve the above object, the product information management device of the present invention is a product information management device that provides a personal WWW page for a user who has been registered as a member, and includes a product information acquisition unit operable to acquire information of a product which the user purchased; a link generation unit operable to generate, on the personal WWW page for the user, a link indicator which is linked to a product questionnaire about the product which the user purchased, based on the acquired information of the product; and a questionnaire presentation unit operable to present the linked product questionnaire to the user upon receiving a request for the product questionnaire from the user.

In the product information management device according to the present invention, the product information acquisition unit acquires information of a product which the user purchased. The link generation unit generates, on the personal WWW page for the user, a link indicator which is linked to a product questionnaire about the product which the user purchased, based on the acquired information of the product. The questionnaire presentation unit presents the linked product questionnaire to the user upon receiving a request for the product questionnaire from the user.

According to the product information management device of the present invention, the user can answer the product questionnaire separately from and after the product registration, so an environment where the user can also answer the questionnaire about the usability of the product can be realized. In addition, since the link indicator to the product questionnaire page is displayed on the user's personal WWW page, My Page, until the user answers it, it is effective for increasing the questionnaire collect rate.

BRIEF DESCRIPTION OF THE DRAWINGS

These and other subjects, advantages and features of the invention will become apparent from the following description thereof taken in conjunction with the accompanying drawings that illustrate a specific embodiment of the invention. In the Drawings:

FIG. 7 is a diagram that shows an example of a questionnaire result 2000 stored in a questionnaire result database 106 as shown in FIG. 1.

FIG. 15 is a diagram that shows a membership registration screen for accepting membership registration to the My Page.

FIG. 20 is a diagram that shows a DVD-RAM product questionnaire screen generated by the product questionnaire management unit as shown in FIG. 1.

FIG. 22 is a diagram that shows a digital camera product questionnaire screen which is linked to the link button displayed on the My Page screen as shown in FIG. 21.

FIG. 25 is a diagram that shows an example of a product master including the questionnaire ID of the product questionnaire which is sent to the user who purchased the product more than one month ago.

DESCRIPTION OF THE PREFERRED EMBODIMENT(S)

The following is a detailed explanation of the embodiment of the present invention with reference to FIG. 1 through FIG. 23.

Figure 1:
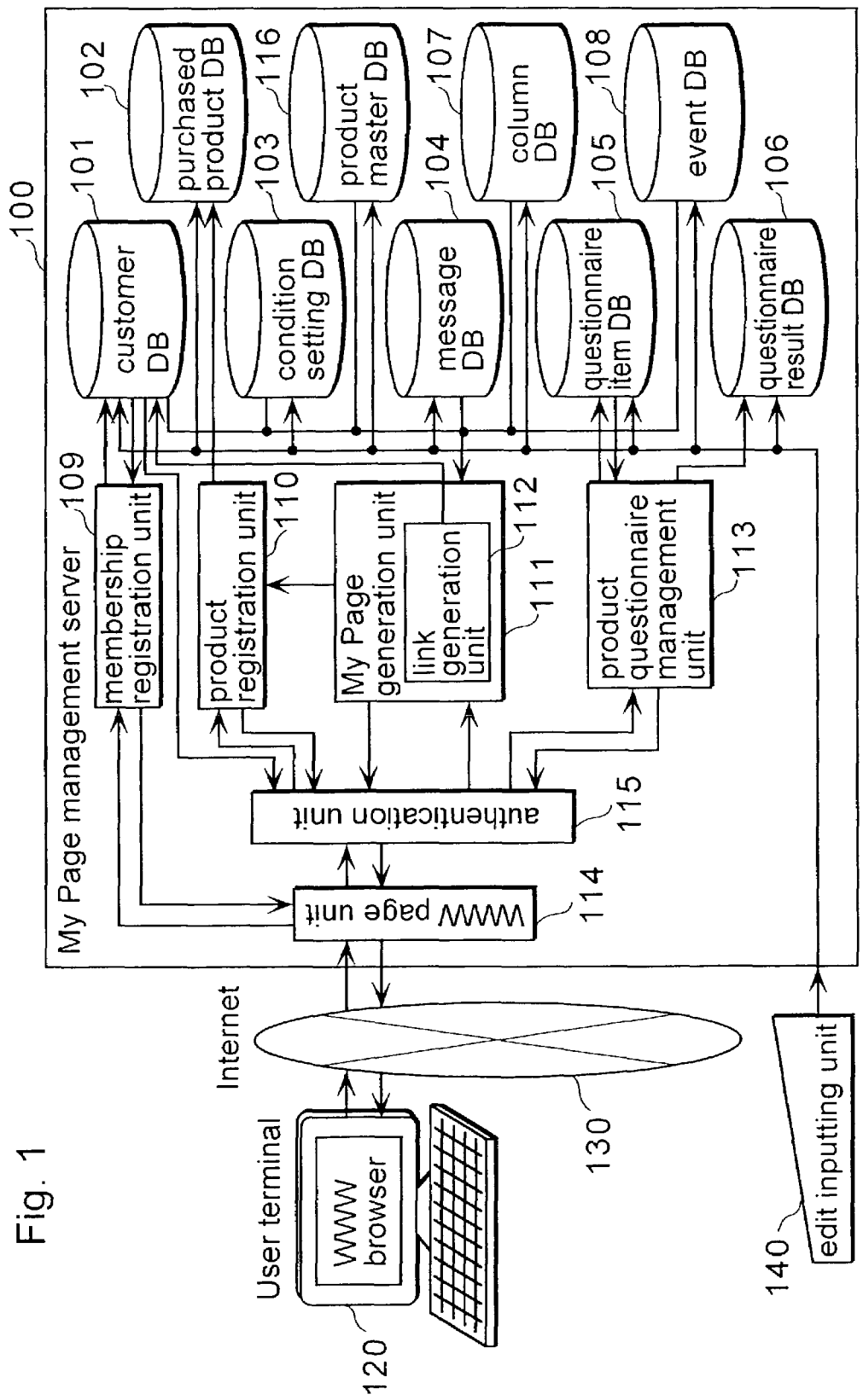
FIG. 1 is a block diagram that shows a structure of a My Page management server according to the embodiment of the present invention.

FIG. 1 is a block diagram that shows a structure of a My Page management server 100 according to the embodiment of the present invention. The My Page management server 100 is a computer that has a WWW browser of a user terminal 120 display a WWW page of a company which sells a product, and generate a link indicator to a page of a product questionnaire on My Page, the page being a personal page of a member user on the company's WWW page, in response to the user's registration of the product he purchased on the My Page. The My Page management server 100 includes nine databases (noted as "DB(s)" in FIG. 1) such as hard disks (a customer database 101, a purchased product database 102, a condition setting database 103, a message database 104, a questionnaire item database 105, a questionnaire result database 106, a column database 107, an event database 108 and a product master database 116), and five processing units realized by a program, etc. (a membership registration unit 109, a product registration unit 110, a My Page generation unit 111, a product questionnaire management unit 113, a WWW page unit 114 and an authentication unit 115). The My Page generation unit 111 includes a link generation unit 112.

A plurality of user terminals 120 such as personal computers are connected to the My Page management server 100 via a communication network 130 such as Internet. An edit inputting unit 140, including an input unit such as a keyboard, is externally connected to the My Page management server 100. Using the edit inputting unit 140, an operator edits the questionnaire items in the questionnaire item database 105 and the data in other databases in response an event such as a sales campaign.

The customer database 101 is a database for memorizing the user's personal information based on the membership registration. Specifically, the customer database 101 has a memory area for holding the user's personal information, such as his address, name, age, sex, occupation, birth date, hobby, and user ID and password for logging in the My Page, registered in the membership registration processing, and a questionnaire ID for identifying an unanswered product questionnaire among the questionnaires of the products purchased by the user, along with the corresponding system user ID that is a user ID set for specifying each user for the internal management.

Figure 2:
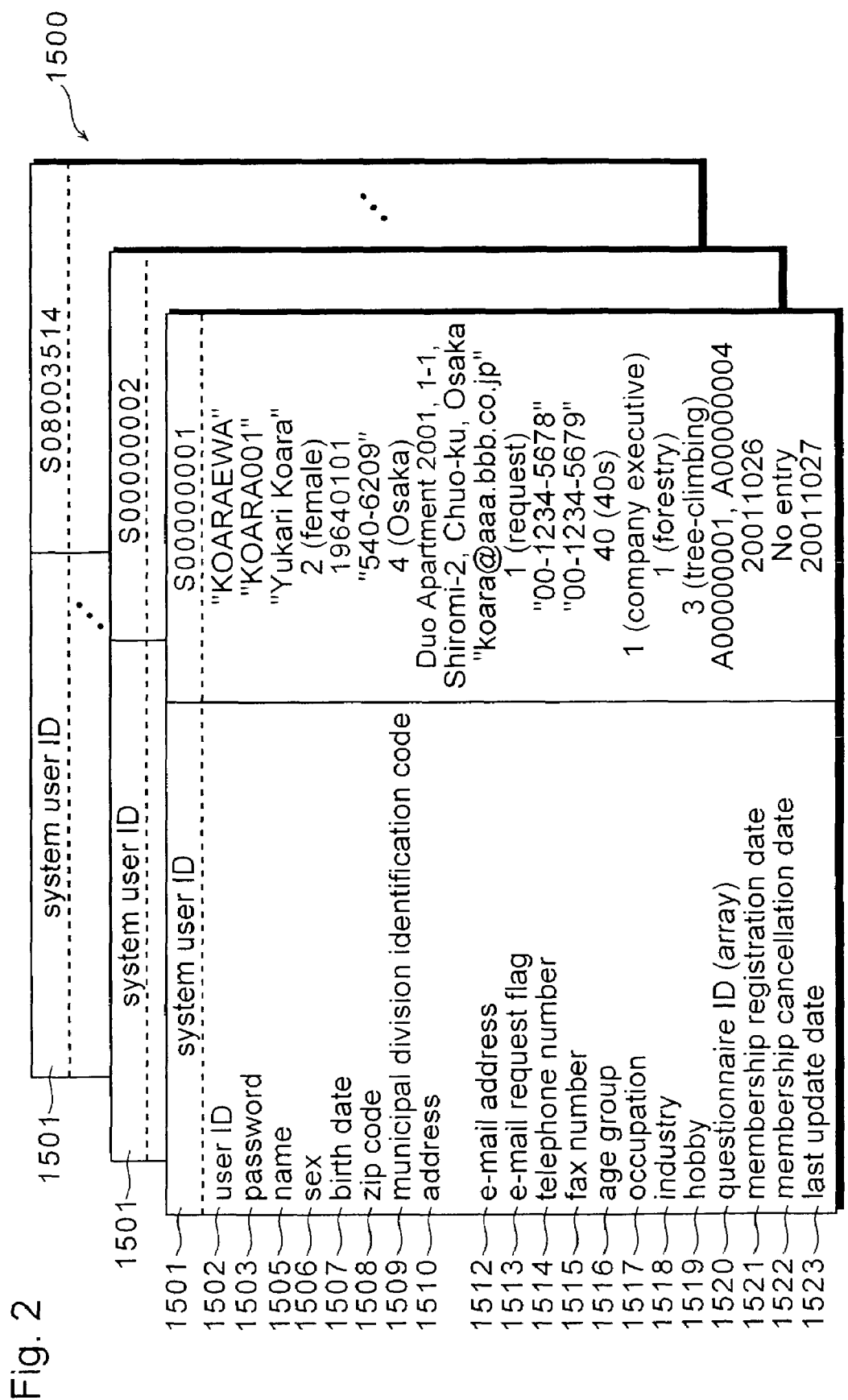
FIG. 2 is a diagram that shows an example of user information 1500 stored in a customer database 101 as shown in FIG. 1.

FIG. 2 is a diagram that shows an example of user information 1500 stored in the customer database 101 as shown in FIG. 1. In FIG. 2 through FIG. 10, the name of each item is indicated in the left part of the user information 1500, and data example to be described in each item is indicated in the right part. Also, key data is described in the items delimited by dashed lines in these figures. As shown in FIG. 2, the user information 1500 is prepared for each user, and managed with a system user ID 1501 as a key. The user information 1500 for each user includes items such as a system user ID 1501, a user ID 1502, a password 1503, a name 1505, a sex 1506, a birth date 1507, a zip code 1508, a municipal division identification code 1509, an address 1510, an e-mail address 1512, an e-mail request flag 1513, a telephone number 1514, a fax number 1515, an age group 1516, an occupation 1517, an industry 1518, a hobby 1519, a questionnaire ID 1520, a membership registration date 1521, a membership cancellation date 1522, and a last update date 1523.

The system user ID 1501 is an item in which the system user ID set by the membership registration unit 109 for the user who has registered his membership is described. The user ID 1502 is an item in which the user ID for the user's logging in his My Page is described. The user ID 1502 is the user ID that the user inputs by himself at the time of his membership registration. The password 1503 is an item in which the password for the user's logging in his My Page is described. This password is inputted by the user himself at his membership registration, as in the case of the user ID described in the user ID 1502. When the user properly inputs the user ID and the password described in the user ID 1502 and the password 1503, respectively, on the authentication screen of the My Page, he is authenticated as an authorized My Page member registered.

In each item of the name 1505 through the hobby 1519, the contents of these items are as their name indicates. In the questionnaire ID 1520, the questionnaire ID specifying an unanswered questionnaires among the product questionnaire on the product registered by the user is described. In the membership registration date 1521, the date when the user has registered his membership is described. In the membership cancellation date 1522, the date when the user has cancelled his membership to the My Page is described. In the last update date 1523, the date when the user has updated his user information 1500 due to his address change, etc. is described.

The purchased product database 102 is a database for memorizing the product registration data on the product purchased and registered by the user. Specifically, the purchased product database 102 has a memory area for holding the product registration data including a product type, a model name, a product number, a purchase date, a serial number, etc., for specifying the product purchased and registered in the product registration processing by the user, along with the corresponding system user ID of the user.

Figure 3:
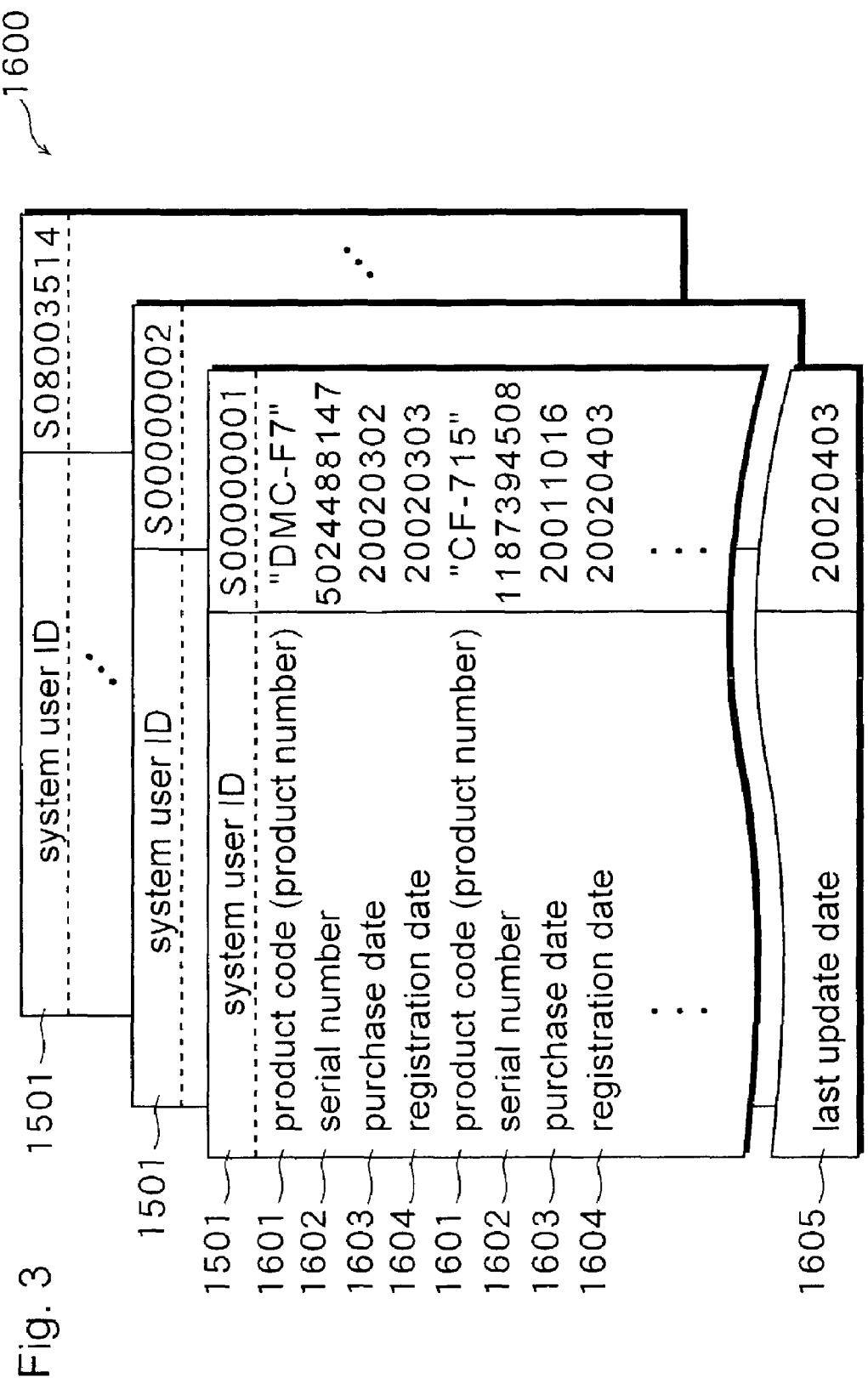
FIG. 3 is a diagram that shows an example of purchased product information 1600 stored in a purchased product database 102 as shown in FIG. 1.

FIG. 3 is a diagram that shows an example of the purchased product information 1600 stored in the purchased product database 102 as shown in FIG. 1. As shown in this figure, the purchased product information 1600 is prepared for each user and managed with the system user ID 1501 as a key. Information for specifying all the products purchased and registered by the user is described in the purchased product information 1600 of each user, which includes items such as a system user ID 1501, a product code (product number) 1601, a serial number 1602, a purchase date 1603, a registration date 1604 and a last update date 1605. Among these items, the product code (product number) 1601, the serial number 1602, the purchase date 1603 and the registration date 1604 are repeated a same number of times as the number of the products registered by the user. In the product code (product number) 1601, the product code for uniquely specifying the type of each product sold by the company is described. In the serial number 1602, the serial number of the product at its manufacturing is described. In the purchase date 1603, the date when the user has inputted as the purchase date of the product on the product registration screen is described. In the registration date 1604, the date when the user has registered the product in the My Page management server 100 is described. In the last update date 1605, the date when the user has registered the product last is described.

The condition setting database 103 is a database that memorizes correspondence between a condition included in the user's personal information and a part of a message stored in the message database 104. Specifically, it holds the correspondence between the each condition such as an age, a sex, an occupation or a hobby included in the user's personal information and the part of the message which has been prepared beforehand corresponding to the condition and stored in the message database 104. More specifically, the message database 104 holds the correspondence between each of the above conditions and the message ID for internal management for specifying the part of the message.

The condition setting database 103 holds the correspondence between each condition and the part of the message stored in the message database 104 in the above case. However, in addition, it may hold the correspondence between the each condition and each column article stored in the column database 107, and the correspondence between each condition and each event information stored in the event database 108.

Figure 4:
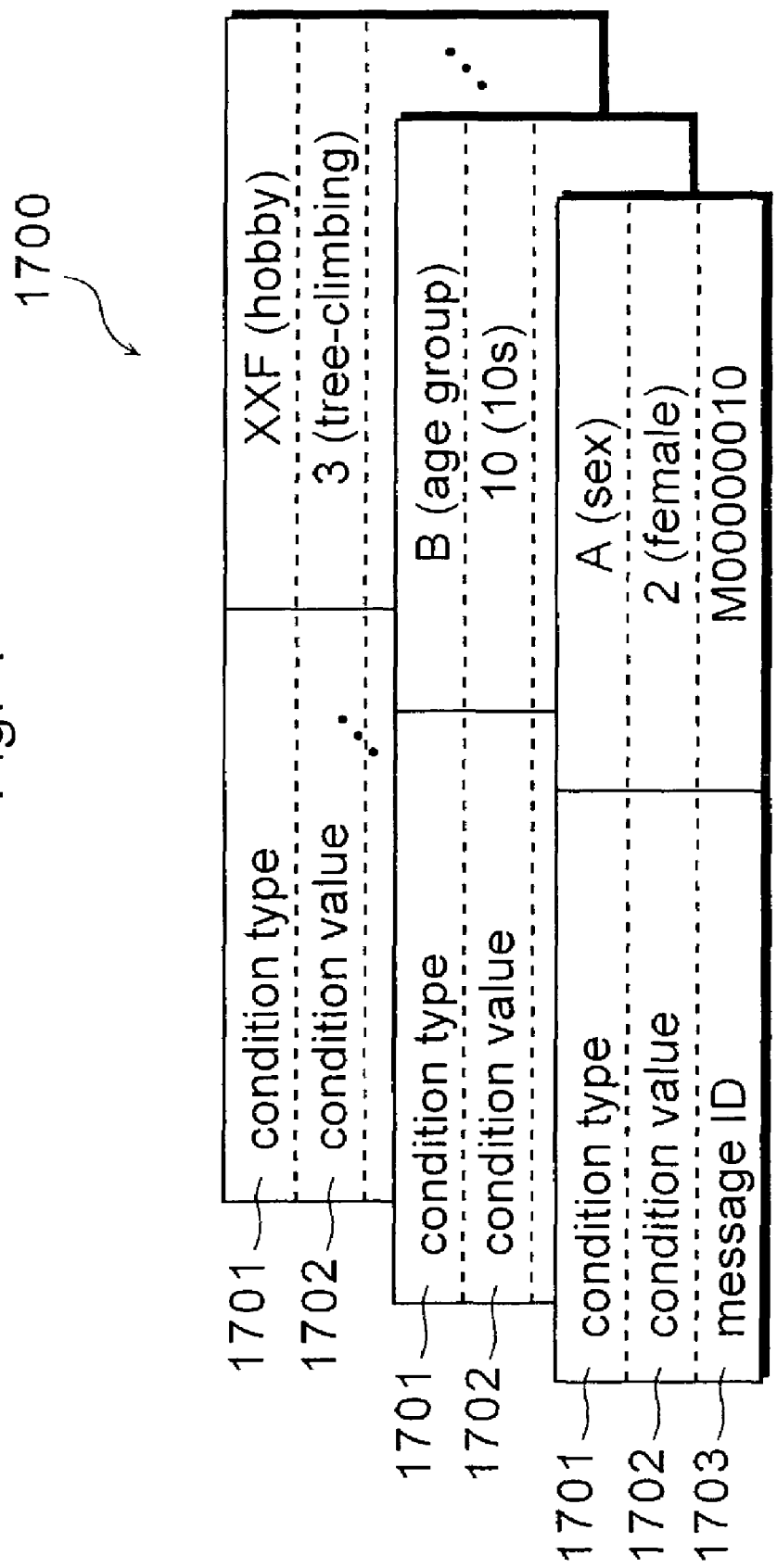
FIG. 4 is a diagram that shows an example of a message selection condition 1700 stored in a condition setting database 103 as shown in FIG. 1.

FIG. 4 is a diagram that shows an example of the message selection condition 1700 stored in the condition setting database 103 as shown in FIG. 1. As shown in this figure, the message selection condition 1700 is data which has been prepared beforehand by an operator using the edit inputting unit 140, etc., and includes a condition type 1701, a condition value 1702 and a message ID 1703. This message selection condition 1700 is managed with the condition type 1701 and the condition value 1702 as a key in the condition setting database 103. The condition type 1701 is an item in which a condition type code for selectively displaying on the My Page a message which seems to be more user-appealing depending upon the user's attributes described in the user information 1500 is described. Specifically, the user's sex, age, birth date, occupation, hobby and so on are described. In the condition value 1702, an actual value which is set on the assumption that the message is selected under the condition described in the condition type 1701 is encoded and described. For example, if the condition described in the condition type 1701 is the sex, "1" is described for a man and "2" is described for a woman, respectively, as actual values of the sex. In the message ID 1703, an ID for specifying each part of the message stored in the message database 104 is described. In this example, when the message is selected according to the condition type 1701 "sex", the parts of the massage acceptable to the condition value 1702 "woman" are specified with the message ID 1703 "M00000010".

The message database 104 holds parts of a message that are the elements of the message for each user. Specifically, the parts of the message are text, graphics and so on that are the elements of the message, which have been prepared beforehand. This message is an individual announcement or information for each user, and is generated on the individual My Page.

Figure 5:
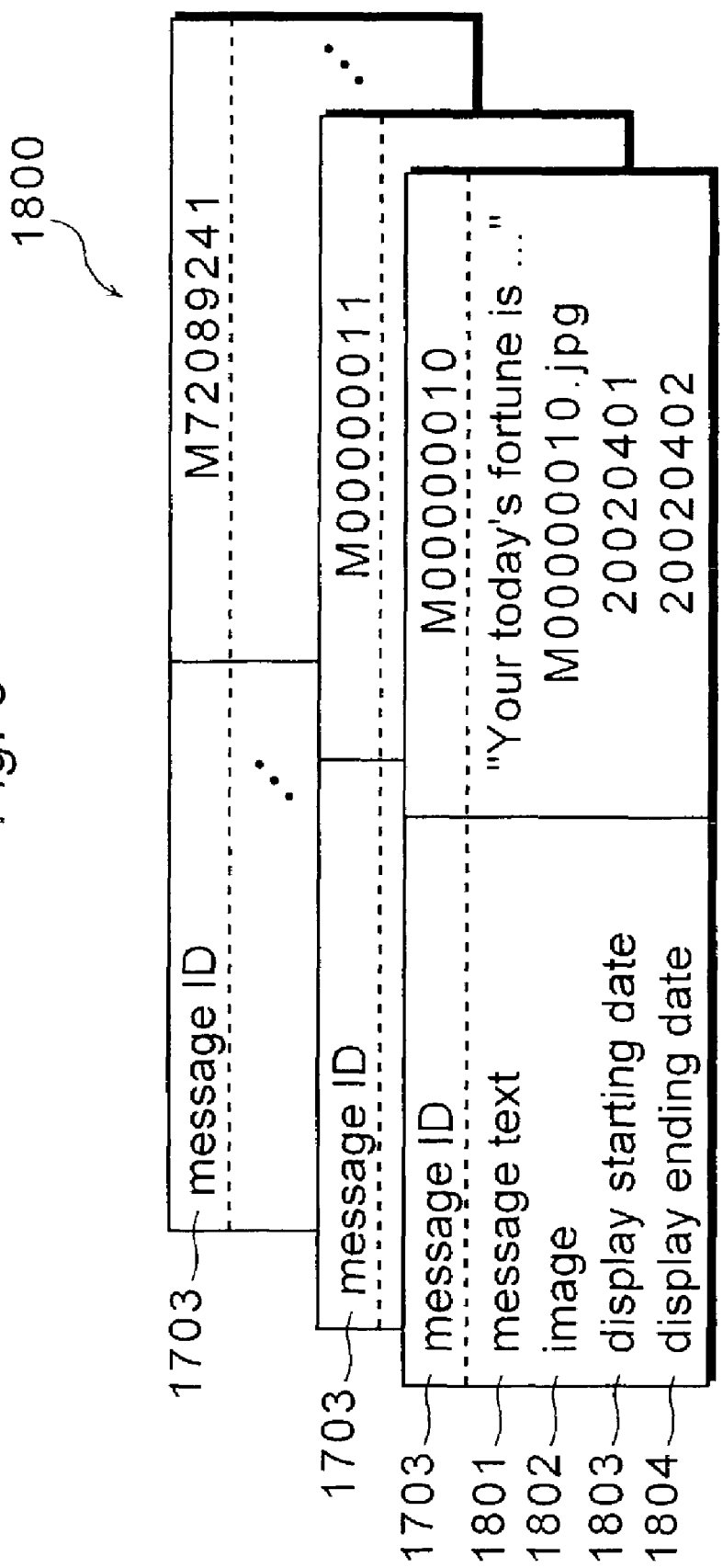
FIG. 5 is a diagram that shows an example of a message part 1800 stored in a message database 104 as shown in FIG. 1.

FIG. 5 is a diagram that shows an example of the message part 1800 stored in the message database 104 as shown in FIG. 1. As shown in this figure, the message part is prepared per message displayed on the My Page, and managed with a message ID 1703 as a key. Each message part 1800 includes the message ID 1703, a message text 1801, an image 1802, a display starting date 1803, a display ending date 1804, etc. In the message text 1801, actual text that is a part of the message displayed on the My Page is described. In the image 1802, a file name of the image file displayed on the My Page along with the corresponding text in the message text 1801 is described. In the display starting date 1803 and the display ending date 1804, the display starting date and the display ending date of this message part 1800 are described, respectively.

The questionnaire item database 105 holds text, such as questionnaire items and display items that are to be parts of the product questionnaire per product and questionnaire pages for displaying them, which have been prepared beforehand. In each item, the corresponding questionnaire ID indicating for which product questionnaire the item is used is held.

Figure 6:
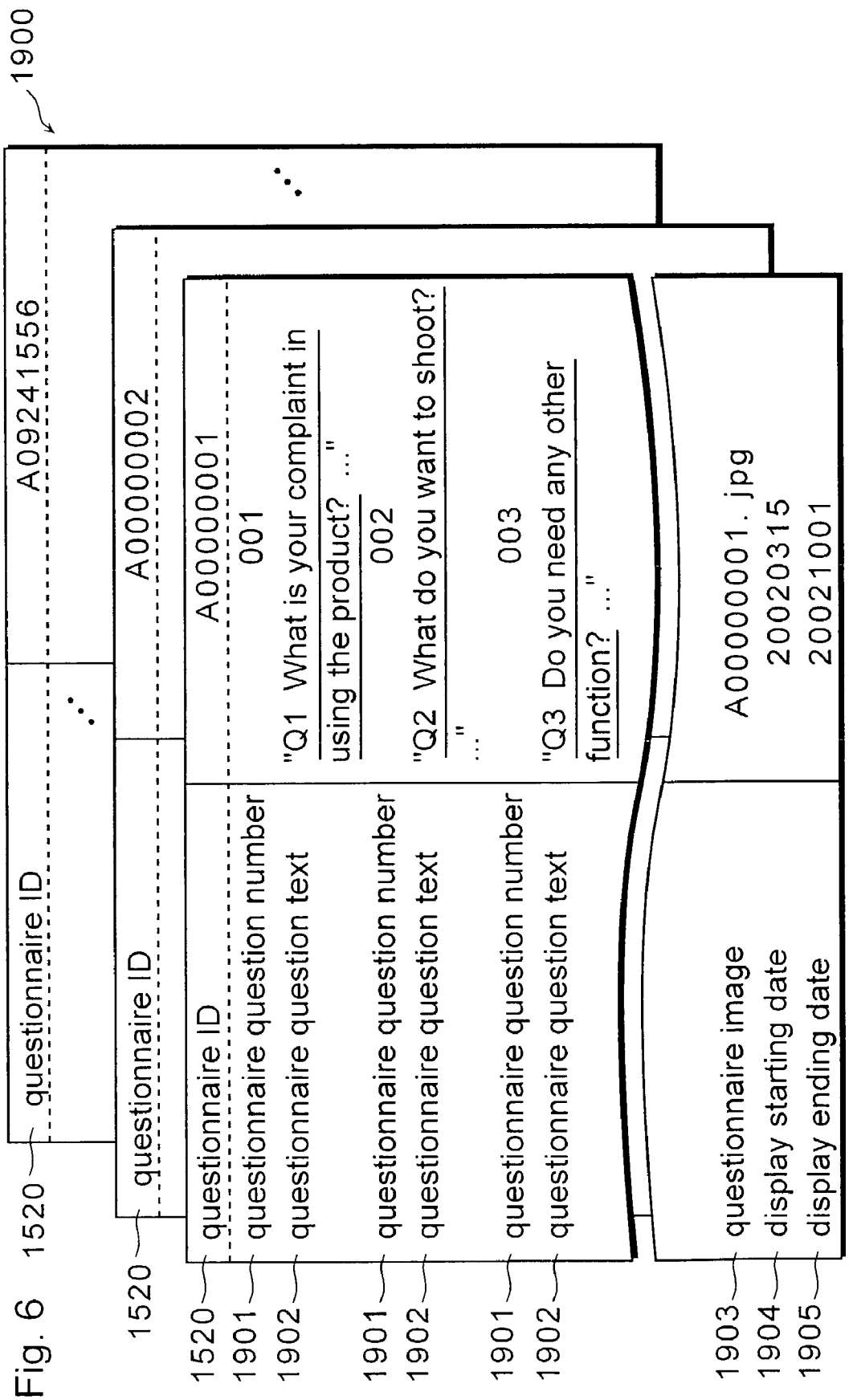
FIG. 6 is a diagram that shows an example of a questionnaire 1900 stored in a questionnaire item database 105 as shown in FIG. 1.

FIG. 6 is a diagram that shows an example of a questionnaire 1900 stored in the questionnaire item database 105 as shown in FIG. 1. In this figure, the question items, the display items, the images, and so on, which are stored correspondingly to the identical questionnaire ID, are collectively shown as one questionnaire 1900. As shown in FIG. 6, the questionnaire 1900 is managed with a questionnaire ID 1520 as a key, and includes the questionnaire ID 1520, a questionnaire question number 1901, a questionnaire question text 1902, a questionnaire image 1903, a display starting date 1904, a display ending date 1905, etc. Among these, the questionnaire question number 1901 and the questionnaire question text 1902 are repeated a same number of times as the number of the questions in the questionnaire 1900. In the questionnaire question number 1901, a number assigned to each question in the questionnaire 1900 is described. Corresponding to this, the same question number is also assigned to the answer to each question in the questionnaire result with the identical questionnaire ID 1520 stored in the questionnaire result database 106. Thereby, the correspondence between each question of the questionnaire 1900 and the answer to each of the questions is established by this questionnaire question number 1901. In the questionnaire question text 1902, the text itself indicating a question of the questionnaire 1900 is described. In the questionnaire image 1903, the file name of the image file indicating an image displayed on the questionnaire 1900 is described. In the display starting date 1904 and the display ending date 1905, the display starting date and the display ending date of the questionnaire 1900 are described, respectively.

The questionnaire result database 106 has a memory area for holding the questionnaire result obtained as an answer to the questionnaire along with the corresponding system user ID of the answerer to the questionnaire. Also, the incomplete result of the questionnaire (whose questions have not yet been completely answered) is also stored in the questionnaire result database 106 together with the complete results of the questionnaire.

FIG. 7 is a diagram that shows an example of the questionnaire result 2000 stored in the questionnaire result database 106 as shown in FIG. 1. As shown in this figure, the questionnaire result 2000 is managed with the system user ID 1501 and the questionnaire ID 1520 as keys. Each questionnaire result 2000 includes items such as the system user ID 1501, a questionnaire ID 1520, a questionnaire question number 1901, a questionnaire answer number 2001, an answer completion flag 2002 and a questionnaire answer date 2003. The numbers described in the items of the questionnaire question number 1901 correspond to respective questions in the questionnaire 1900 with the identical question ID 1520, as described above. In the questionnaire answer number 2001, the number for specifying an answer to each question of the questionnaire 1900 is described. When a plurality of answers are allowed to the same question, a plurality of answer numbers are described. In the answer completion flag 2002, a flag indicating whether the answer to the questionnaire has been completed or not is described. For example, "1" is used when the answer has been completed, and "0" is used when the answer is temporarily stored uncompleted, respectively. In the questionnaire answer date 2003, the date when the user completed the answer to the questionnaire is described.

Figure 8:
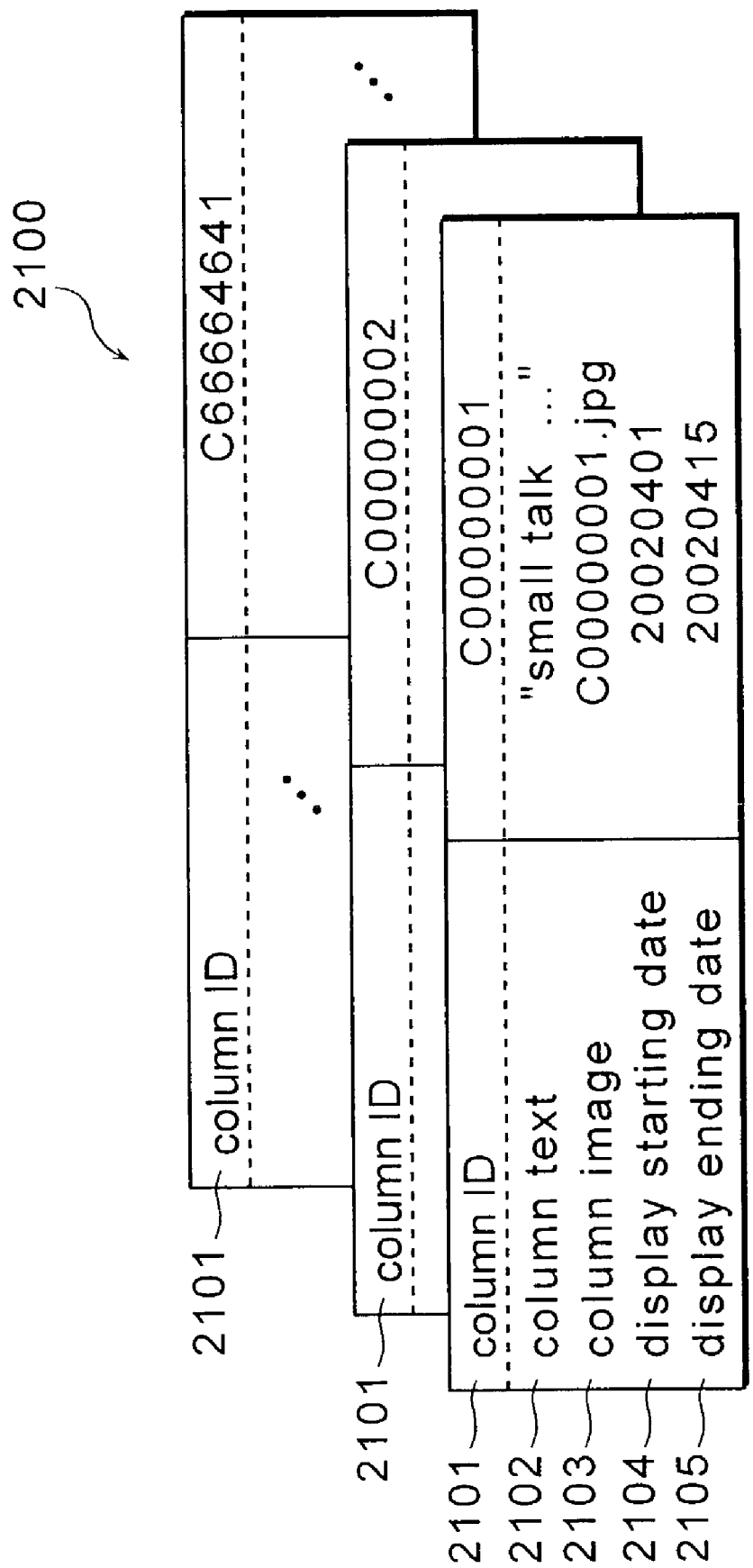
FIG. 8 is a diagram that shows an example of column data 2100 stored in a column database 107 as shown in FIG. 1.

The column database 107 holds a column article which has been prepared beforehand and constitutes the column spot of the My Page common to all users. FIG. 8 is a diagram that shows an example of the column data 2100 stored in the column database 107 as shown in FIG. 1. As shown in this figure, the column data 2100 is data indicating a column article of each column, and is managed with a column ID 2101 as a key. Each column data 2100 includes the column ID 2101, a column text 2102, a column image 2103, a display starting date 2104, a display ending date 2105, and so on. In the column ID 2101, an ID for specifying each column data 2100 is described. In the column text 2102, a text indicating the column article which has been prepared beforehand is described. In the column image 2103, an image file name of an image displayed along with the text described in the column text 2102 is described. In the display starting date 2104 and the display ending date 2105, the date when the display of the column article starts and the date when the display of the column article ends are described, respectively.

Figure 9:
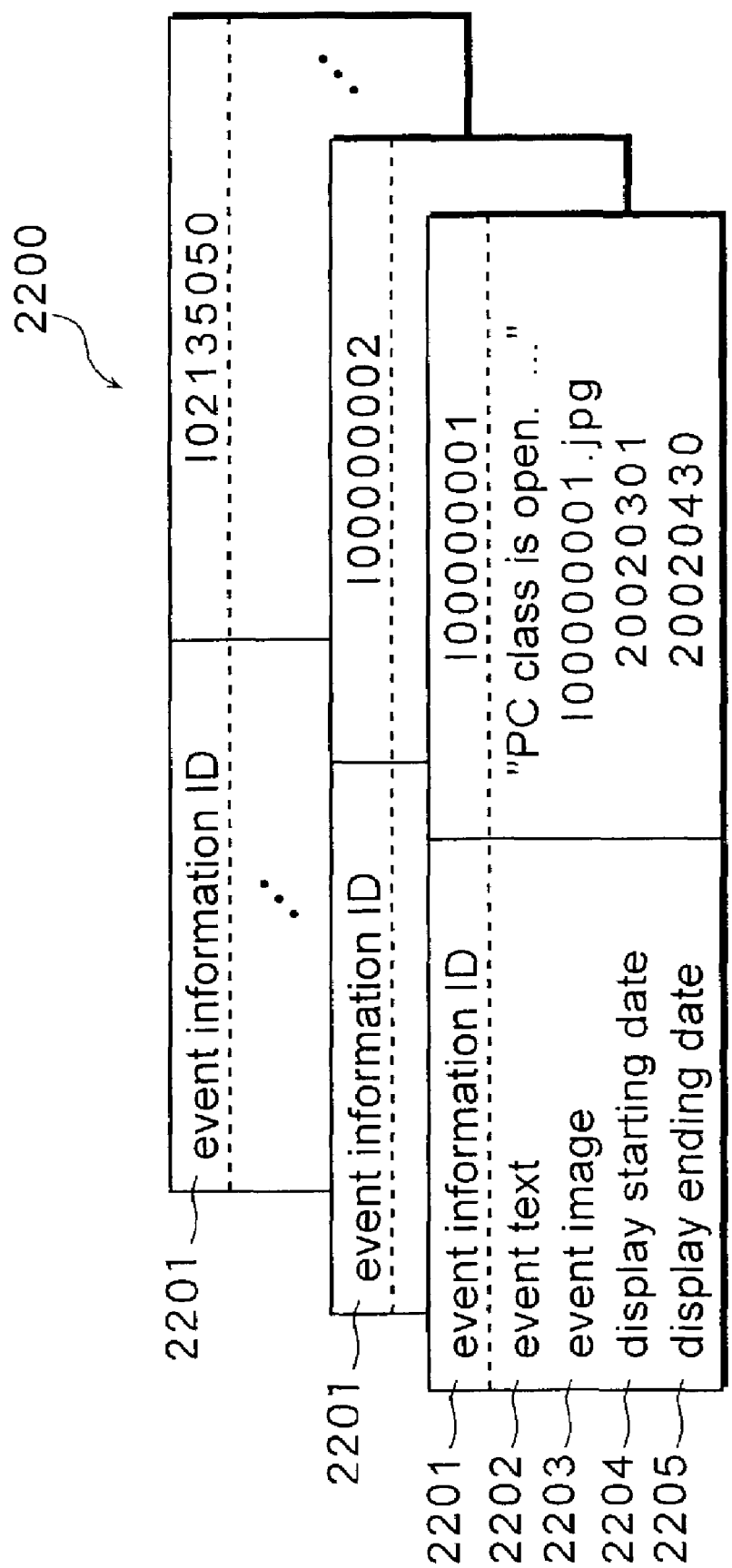
FIG. 9 is a diagram that shows an example of event information 2200 stored in an event database 108 as shown in FIG. 1.

The event database 108 holds event information which has been prepared beforehand and constitutes the event information spot of the My Page common to all users. FIG. 9 is a diagram that shows an example of the event information 2200 stored in the event database 108 as shown in FIG. 1. As shown in this figure, the event information 2200 is managed with an event information ID 2201 as a key. Each event information 2200 includes the event information ID 2201, an event text 2202, an event image 2203, a display starting date 2204 and a display ending date 2205. In the event information ID 2201, an ID for specifying each event information 2200 is described. In the event text 2202, text indicating the text of the event article is described. In the event image 2203, an image file name of an image displayed on the My Page along with the event article is described. In the display starting date 2204 and the display ending date 2205, the date when the display of the event article starts and the date when the display of the event article ends are described, respectively.

The membership registration unit 109 performs processing of the user's membership registration to the My Page on the company's WWW page. The membership registration unit 109 is started by pressing the membership registration button on the WWW page, has the browser of the user terminal 120 display the membership registration screen, and accepts the user's membership registration interactively. Furthermore, the membership registration unit 109 assigns a user ID for internal management to each user who has registered his membership, and stores the personal information of each user acquired by the membership registration in the customer database 101, along with the corresponding system user ID 1501.

The product registration unit 110 accepts interactively the registration of the purchased product by the user who has logged in the My Page under the authentication by the authentication unit 115. Specifically, the product registration unit 110 is started up by pressing the product registration button displayed on the My Page, and accepts the input of the product registration data for specifying the product purchased by the user. The product registration unit 110 stores the product registration data of which input has been accepted in the purchased product database 102, along with the corresponding system user ID 1501 of the user. The product registration unit 110 looks up the questionnaire ID of the product questionnaire corresponding to the registered product in the product master database 116, and additionally writes the questionnaire ID in the unanswered product questionnaire item of the customer database 101.

After the authentication by the authentication unit 115, the My Page generation unit 111 dynamically generates My Page that is the user's personal page accessible only to the user, as a file in the HTML format, for instance, every time the user logs in the My Page. Specifically, in response to the notice from the authentication unit 115, the My Page generation unit 111 first extracts from the message database 104 parts of a message corresponding to each condition in the personal information in the customer database 101, with reference to the condition setting database 103, combines the extracted parts, and generates individual message for each user in a predetermined place on the My Page. Furthermore, the My Page generation unit 111 pastes the column article and the event information common to all users, which have been respectively read out from the column database 107 and the event database 108, in predetermined places on the My Page, generates the My Page, and then, outputs the file of the generated My Page to the WWW page unit 114.

Furthermore, when the registration data button on the My Page is pressed, the My Page generation unit 111 reads out the personal information corresponding to the system user ID 1501 of the user and the product registration data of the purchased product corresponding to that system user ID 1501 of the user from the customer database 101, and generates a file of a registered product data list page for having the browser display the read-out personal information and registered product data. Next, the My Page generation unit 111 sends the generated file of the registered product data list page to the corresponding user terminal 120 via the WWW page unit 114, and terminates the registered data viewing processing. As described above, since the My Page generation unit 111 has a function of displaying the data of the product registered by the user, the user does not need to memorize all the data of the product he registered. All that the user needs to do in registering the product is to view the registered product data list page and register only the unregistered ones, so repeating the registration of the same product can be avoided. This is convenient for the user.

Note that the column article and the event information are common to all users in the above case. However, it may be configured so that the correspondence between each column article and event information and the condition in the personal information is stored in the condition setting database 103. The column article and the event information which seem to be more suitable to the user are extracted from each database depending upon the user's age, sex, hobby, etc. and then pasted on each spot.

The link generation unit 112 is a processing unit that generates a link indicator to the product questionnaire corresponding to the registered product in a predetermined place on the user's My Page. Specifically, the link generation unit 112 is started up when the My Page generation unit 111 generates the My Page, checks whether there is an unanswered product questionnaire of the product purchased by the user with reference to the customer database 101 every time it is started up, and reads out the questionnaire ID for identifying the product questionnaire. Furthermore, the link generation unit 112 generates text (link button) to the product questionnaire specified with the read-out questionnaire ID in a predetermined place of the My Page, embeds a questionnaire generation command based on the read-out questionnaire ID onto the back of the link button, and terminates the link generation processing.

The product questionnaire management unit 113 is a processing unit that dynamically generates the product questionnaire corresponding to the registered product when the link button to the product questionnaire is pressed, and is realized by a Web application server (development and operation tool) or the like based on Sun Microsystems' JSP (Java Server Pages) or Microsoft's ASP (Active Server Pages), for instance. The product questionnaire management unit 113 is started up when the link button to the product questionnaire displayed on the My Page on the browser of the user terminal 120 is pressed and the questionnaire generation command embedded into the link button is received by the WWW page unit 114. The product questionnaire management unit 113 reads in the questionnaire item stored in the questionnaire item database 105 according to the questionnaire ID included in the questionnaire generation command, pastes the read-in questionnaire item on the questionnaire page, and generates the product questionnaire. Also, the product questionnaire management unit 113 puts a send button for the user to send the answer to the questionnaire at the bottom of the questionnaire screen. The product questionnaire management unit 113 generates a file of the above product questionnaire in a memory area of the WWW page unit 114, sends it to the user terminal 120 via the WWW page unit 114, and acquires the answer returned from the user terminal 120 via the WWW page unit 114. The product questionnaire management unit 113 stores the acquired questionnaire answer data in the questionnaire result database 106 along with the corresponding system user ID 1501 of the user who answered the questionnaire, clears the questionnaire ID of the unanswered questionnaire in the customer database 101, and then terminates the processing.

The WWW page unit 114 has a memory area for holding the My Page file of each user generated by the My Page generation unit 111 along with the correspondence to the system user ID 1501. When the user who accessed the My Page is authenticated as a registered member by the authentication unit 115, the WWW page unit 114 performs a function as a part of the My Page management server 100 as a WWW server for sending the My Page file corresponding to that user. The WWW page unit 114 further holds files such as an HTML file for having the browser display the company's WWW page, the membership registration screen and the product registration screen, and a GIF file, a BMP file and a JPG file linked to those pages and screens. When the link button described on each page is pressed, the WWW page unit 114 reads out the file corresponding to the page from the memory area, sends it to the user terminal 120, receives the corresponding answer from the user terminal 120, attaches the system user ID 1501 of the user who answered the questionnaire to the answer, and then transmits it to the corresponding processing unit.

The authentication unit 115 authenticates whether the user who logs in the My Page is an authorized user registered as a member of the My Page or not. Specifically, the authentication unit 115 acquires the user ID and the password from the WWW page unit 114, inputted by the user to log in the My Page on the WWW page provided by the WWW page unit 114, and collates the acquired user ID and password with the user ID and the password for authentication stored in the customer database 101. When both user IDs and passwords match as a result of the collation, the authentication unit 115 authenticates the user as an authorized and registered member user, and has the My Page generation unit 111 generate the corresponding My Page. Also, when both user IDs and passwords do not match as a result of the collation, the authentication unit 115 notifies the WWW page unit 114 of the authentication result, and has it display a message urging the user to re-input the user ID and the password on the screen of the user terminal 120.

The user terminal 120 is a communication terminal such as a personal computer, cellular phone or a PDA (Personal Digital Assistant) having a WWW browser.

The product master database 116 memorizes a product master that is a table which has been prepared beforehand indicating the correspondence between the product sold by the company, the product information and the product questionnaire. In the product master, the correspondence between the product and the product questionnaire is indicated by the correspondence between the product code that is an internal management ID for specifying each product and the questionnaire ID for identifying each product questionnaire, for instance.

Figure 10:
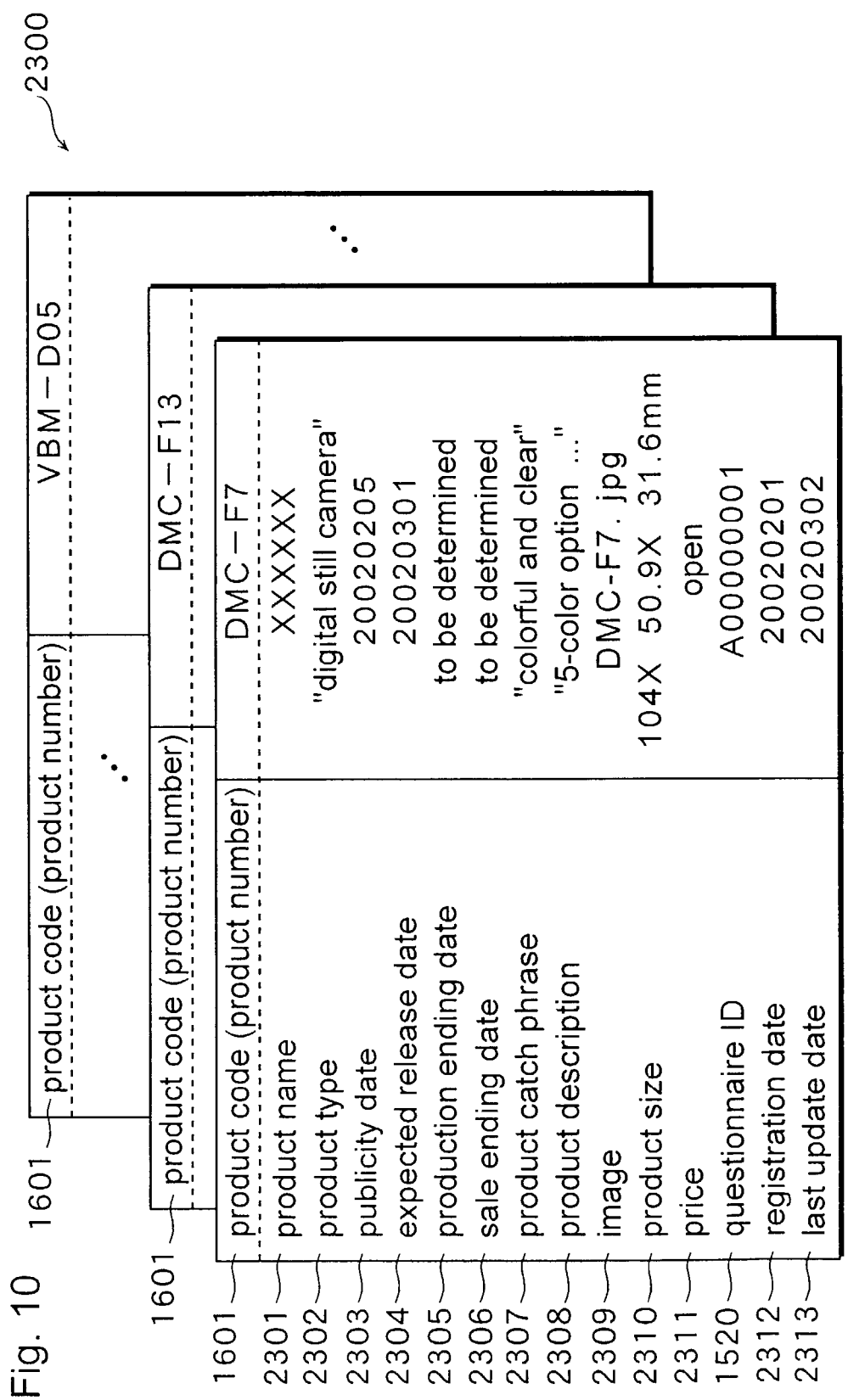
FIG. 10 is a diagram that shows an example of a product master 2300 stored in a product master database 116 as shown in FIG. 1.

FIG. 10 is a diagram that shows an example of the product master 2300 stored in the product master database 116 as shown in FIG. 1. As shown in this figure, the product master 2300 is managed with a product code (product number) 1601 as a key. Each product master 2300 includes items such as the product code (product number) 1601, a product name 2301, a product type 2302, a publicity date 2303, an expected release date 2304, a production ending date 2305, a sale ending date 2306, a product catch phrase 2307, a product description 2308, an image 2309, a product size 2310, a price 2311, a questionnaire ID 1520, a registration date 2312, and a last update date 2313. In the product name 2301 and the product type 2302, the contents of these items are as their names indicate. In the publicity date 2303, the date when the product was made public by an advertisement or the like of the product is described. In the expected release date 2304, the production ending date 2305, the sale ending date 2306 and the product catch phrase 2307, the contents of these items are as their names indicate. In the product description 2308, text indicating the description of the product is described. In the image 2309, the image file name of the image displayed together with the product description such as a photograph or an external view of the product is described. In the product size 2310 and the price 2311, the contents of these items are as their names indicate. In the registration date 2312, the date when an operator prepared the product master 2300 is described. In the last update date 2313, the date when the date in the product master 2300 was last updated due to a change, an addition or a deletion of the data is described.

The communication network 130 is a communication network such as the Internet, which transfers data using a communication line such as a telephone line.

The edit inputting unit 140 is used for adding or deleting a new article or information to or from the contents stored in each database, or editing them, when the contents to be displayed on the My Page or to be asked in the questionnaire are changed, or when an article more suitable for the column article or the event article occurs even in a normal case. The edit inputting unit 140 is an external input unit which is connected to the My Page management server 100, and has an editing function by an editing program and an input operation unit such as a mouse or a keyboard. The edit inputting unit 140 edits the condition set in the condition setting database 103, the message part in the message database 104, the text of the item in the questionnaire item database 105, the column article in the column database 107, the event information in the event database 108 and so on according to the operator's edit input operation.

Next, operation of the My Page management server 100 as configured above will be explained below with reference to the flowcharts, the state transition diagram and screen diagrams of FIG. 11 through FIG. 23.

Figure 11:
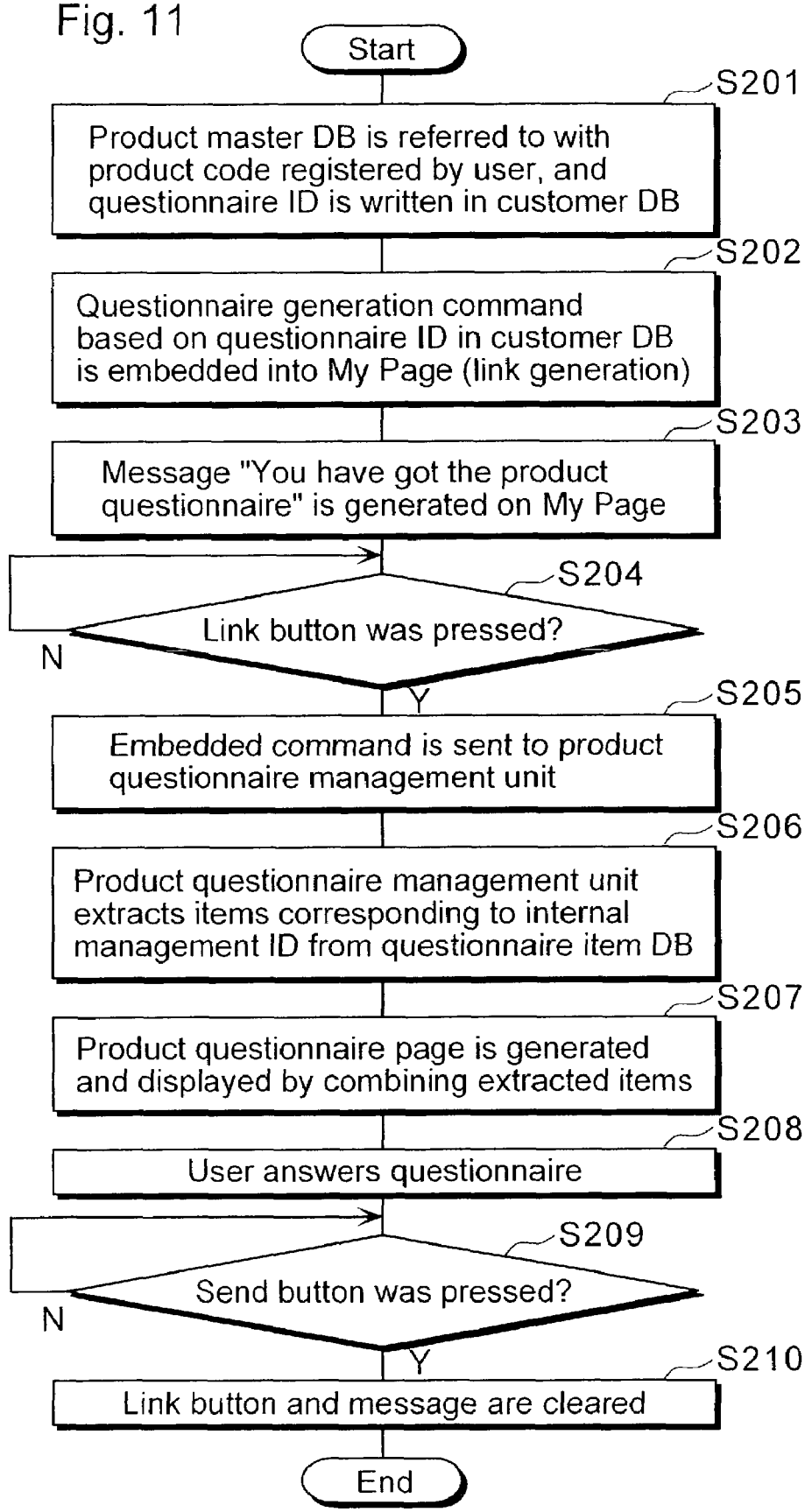
FIG. 11 is a flowchart that shows a processing procedure of generating/clearing a link indicator by each processing unit in the My Page management server as shown in FIG. 1.

FIG. 11 is a flowchart that shows a processing procedure of generating/clearing a link indicator in each processing unit in the My Page management server 100 as shown in FIG. 1. The following is explained on the assumption that the user has registered his membership of the My Page beforehand, authenticated by the authentication unit 115 as a result of properly inputting his user ID and password set at the membership registration, and thus his own My Page is displayed on the browser of the user terminal 120.

When the user presses the product registration button displayed on the My Page, the product registration unit 110 is started up in the My Page management server 100, and the WWW page unit 114 sends an HTML file for having the browser of the user terminal 120 display the product registration screen to the user terminal 120 of that user. The user inputs the product registration data for specifying the purchased product in each input field of the product registration screen displayed on the user terminal 120 and presses the registration button on the product registration screen, and thus sends the data to the My Page management server 100. Upon receiving the product registration data via the WWW page unit 114, the product registration unit 110 stores in the customer database 101, the questionnaire ID obtained by searching the product master database 116 with the product code of the product as a key, along with the corresponding system user ID 1501 of the user, stores the received product registration data in the purchased product database 102 along with the corresponding system user ID 1501 of the user, and then notifies the user terminal 120 via the WWW page unit 114 that the product registration procedure has been completed (S201). Since the user has completed the product registration procedure which is the original purpose, he may disconnect the line at that time, a link to server site another than the WWW page unit 114, or go back to the display of the My Page.

When the user exits the product registration screen or logs in again and obtains the proper authentication, the My Page generation unit 111 starts up the link generation unit 112, and generates the My Page of the user. The link generation unit 112 checks whether there is an unanswered product questionnaire about the product registered by the user with reference to the customer database 101 of the user, and if there is, generates a link button in a predetermined place in the HTML file of the My Page using the parts in the message database 104 (S202). Specifically, the link generation unit 112 embeds a questionnaire generation command of the product questionnaire onto the back of the text announcing to the user that a Web link is provided to the product questionnaire, such as text "Click here for the questionnaire.", and generates the link button. At that time, the link generation unit 112 reads out a questionnaire ID for identifying the product questionnaire from the customer database 101, and generates the questionnaire generation command based on the read-out questionnaire ID. In response to that, the My Page generation unit 111 reads out the parts of the message, the text such as "You've got the product questionnaire on" and "in the questionnaire spot", from the message database 104, as well as extracts the product type specified with the product code among the product registration data, such as the text "DVD-RAM", from the product type 2302 of the product master database 116, inserts the extracted text "DVD-RAM" into between the two texts "You've got the product questionnaire on" and "in the questionnaire spot", and generates the message for the user (S203).

The My Page generation unit 111 pastes the message generated as above in the area of the message spot on the My Page, generates the My Page (with a link indicator) on the memory area of the WWW page unit 114, and sends it to the user terminal 120 via the WWW page unit 114. Accordingly, the My Page management server 100 completes the above-mentioned processing of the link generation unit 112 and the My Page generation unit 111 no later than the product registration unit 110 stores the product registration data in the purchased product database 102, notifies the user of the completion of the product registration, and the user receives the notice. Then, the My Page management server 100 sends the updated My Page to the user terminal 120, and the user terminal 120 displays the new My Page with the link button to the generated product questionnaire.

The WWW page unit 114 repeats the determining at regular intervals as to whether the link button is pressed or not, that is, whether the data attached with the system user ID of the user is received or not, and stands by until the link button is pressed (S204). When the user presses the link button to the product questionnaire according to the message on the My Page, the questionnaire generation command embedded in the link button is sent to the WWW page unit 114, and the product questionnaire management unit 113 is started up (S205).

The product questionnaire management unit 113 extracts the questionnaire items stored in the questionnaire item database 105 according to the questionnaire ID included in the questionnaire generation command (S206), combines the extracted questionnaire items in a predetermined order, pastes them on the questionnaire page, and then generates the file of the product questionnaire. Also, the product questionnaire management unit 113 has provided a send button for sending the questionnaire answer from the user terminal 120 to the WWW page unit 114 on this product questionnaire screen. The product questionnaire management unit 113 sends the file of the product questionnaire generated as described above to the user terminal 120 via the WWW page unit 114, and the browser of the user terminal 120 displays the product questionnaire screen (S207).

While the user is answering the questionnaire items provided on the product questionnaire screen (S208), the WWW page unit 114 repeats the determining at regular intervals as to whether the send button was pressed or not, and stands by until the send button is pressed (S209). When the user presses the send button, the answer data that is the answer to the product questionnaire is sent to the WWW page unit 114. The WWW page unit 114 transfers the received answer data of the product questionnaire to the product questionnaire management unit 113, and the product questionnaire management unit 113 stores the transferred answer data in the questionnaire result database 106 along with the corresponding system user ID 1501 of the user who answered the questionnaire and clears the questionnaire ID 1520 of the product questionnaire from the user information 1500 in the customer database 101.

When the send button is pressed on the product questionnaire screen, the My Page generation unit 111 starts up the link generation unit 112 and generates the My Page of the user. If there is the questionnaire ID indicating that an unanswered product questionnaire on the product registered by the user is in the customer database 101, the link generation unit 112 generates a link indicator to that product questionnaire, but if there is no unanswered product questionnaire, nothing is done. As a result, the link button on the My Page linked to the product questionnaire is cleared from the My Page on which the link button has been displayed before the product questionnaire is answered. In response to this, the My Page generation unit 111 also does not paste the announcement of the product questionnaire such as "You've got the product questionnaire on DVD-RAM in the questionnaire spot" in the area of the message spot on the user's My Page. A result, the announcement of the product questionnaire such as "You've got the product questionnaire on DVD-RAM in the questionnaire spot" is cleared from the My Page before the product questionnaire is answered (S210).

As described above, the product questionnaire management unit 113 dynamically generates the product questionnaire page after the link button to the product questionnaire is pressed, so it does not need to hold the files of the product questionnaires of the number of products sold by the company or associated files. In addition, even when the contents of the questionnaire are changed due to events such as a sales campaign, a version upgrade and a model change of each product, the product management unit 113 may just modify each question of the questionnaire, so that it can reduce the load of generating a new questionnaire file, or of reading out and editing the questionnaire file which has been used every time the event occurs. This is an effective way to reduce the processing load.

Also, since the link generation unit 112 generates the link button to the product questionnaire for each product purchased and registered by the user on his personal page, My Page, the user can omit an operation of inputting his own personal information and a product code for specifying the purchased product for each product questionnaire, and thus the time required for the input operation can also be reduced. Furthermore, since the user can conduct the questionnaire answering operation at a time other than (after) the product registration, the My Page management server 100 can provide for users an environment that is available for questions about product usability. Meanwhile, since the link indicator to the product questionnaire page is displayed on the user's personal My Page and calls the user's attention to it until he completes the questionnaire answering operation of the product, there is also an effect of increasing the return rate of the questionnaire. In addition, since the question can be answered at a different time from that of the product registration, that is, the question does not need to be answered following the product registration, more items can be inputted under the same workload.

Figure 12:
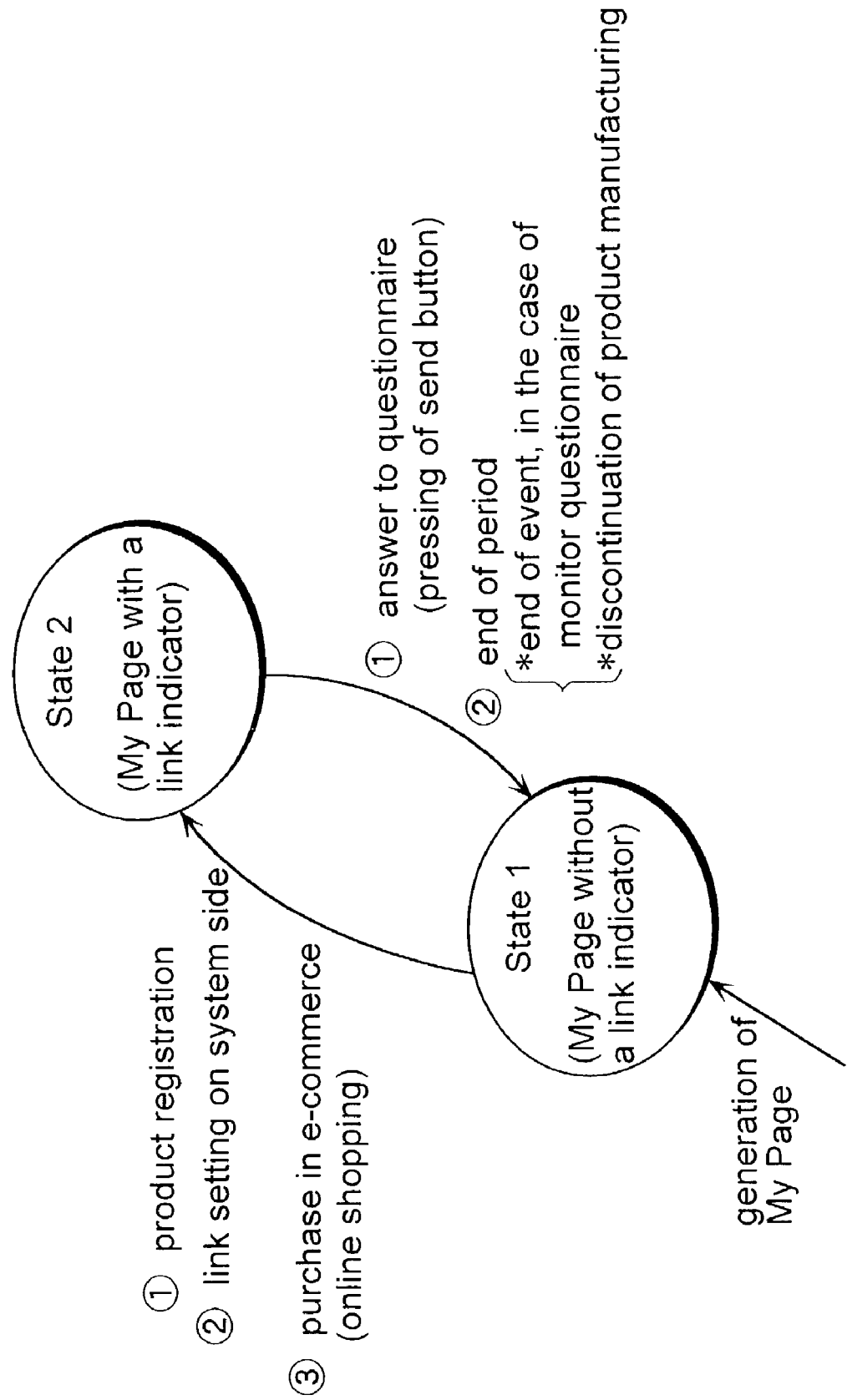
FIG. 12 is a state transition diagram that shows each state of the My Page generated by the My Page generation unit as shown in FIG. 1 and the causes of the state transition.

FIG. 12 is a state transition diagram that shows each state of the My Page generated by the My Page generation unit 111 and the causes of the state transition. There are two types of states, state 1 and state 2, for the My Page generated by the My Page generation unit 111. State 1 is the state before the link indicator to the product questionnaire is embedded, and the state 2 is the state after the link indicator to the product questionnaire is embedded by the link generation unit 112. The My Page of the state 1 without a link indicator is generated by the My Page generation unit 111 because of the user's membership registration to the My Page.

A link button is generated by the link generation unit 112 on the My Page of the state 1 without a link indicator, the product questionnaire generation command is embedded into the link button, and thus the My Page of state 2 with a link indicator is created due to the following causes. The three reasons for transitioning from state 1 to state 2 are as follows:

(1) The user registers the product using the product registration button on the My page.

(2) When the user is monitoring the product during the company's sales campaign, etc., a link is established to a monitor questionnaire using the edit inputting unit 140 or the other processing unit at the My Page management server 100 side.

(3) When the user purchases a product online in e-commerce, the My Page management server 100 is notified of the product purchase directly from the site where the product was sold, and the product is registered in the purchased product database 102 by the edit inputting unit 140 or the other processing unit.

There are the following two reasons for transitioning from state 2 to state 1:

(1) The user answers the product questionnaire and presses the send button for sending his answer to the My Page management server 100.

(2) The questionnaire period ends, of which there are two cases. In the case of the monitor questionnaire, when the event for the product, such as the sales campaign period or the monitor period ends, the questionnaire period also ends. Also, when the manufacturing of the product is discontinued, the questionnaire period also ends in response to it. In this case, the edit inputting unit 140 or the other processing unit at the My Page management server 100 side clears the link indicator from the My Page.

Figure 13:
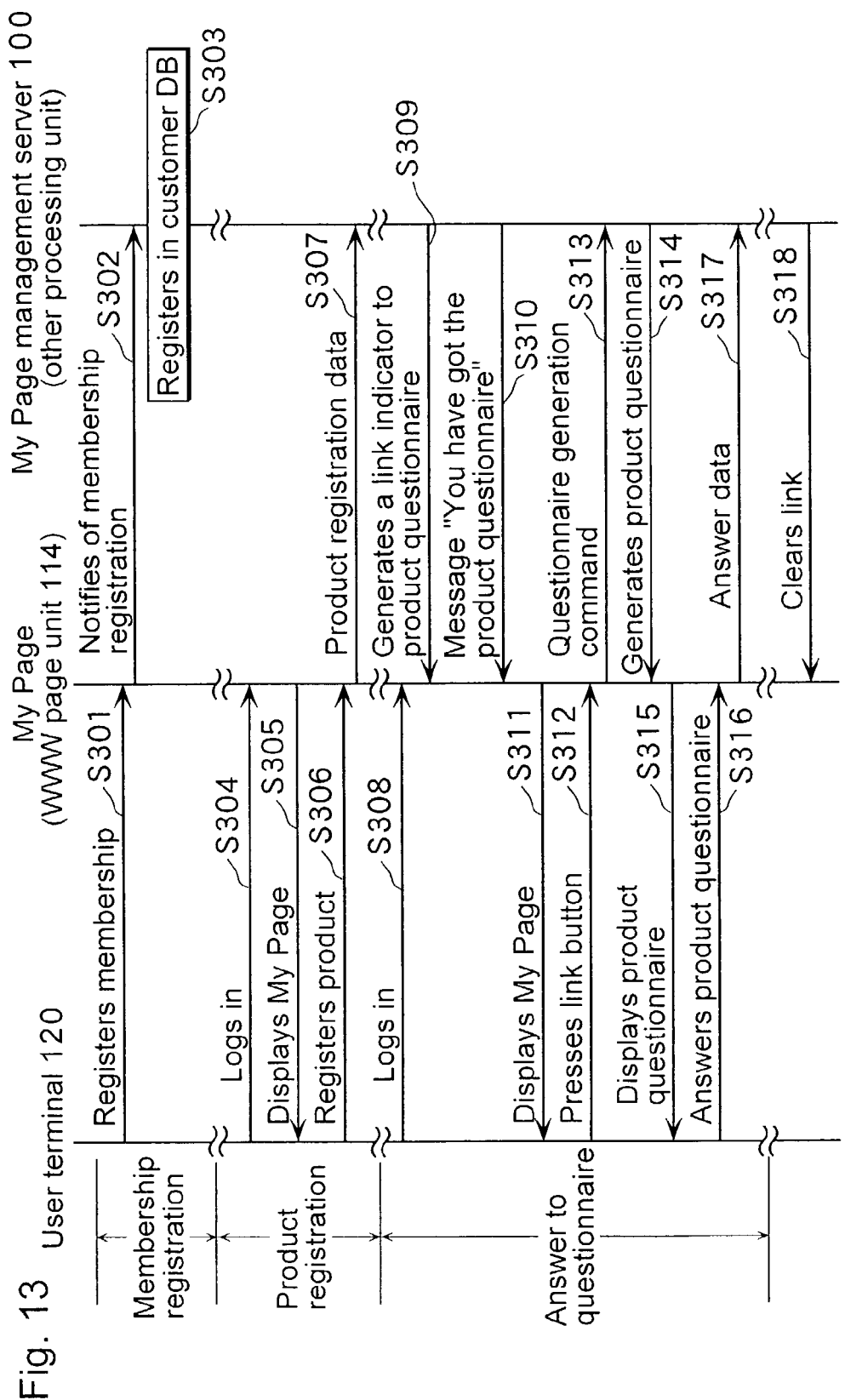
FIG. 13 is a communication sequence diagram that shows a communication procedure between the user terminal and the My Page management server (the other processing unit) via the My Page (a WWW page unit) as shown in FIG. 1.

FIG. 13 is a communication sequence diagram that shows a communication procedure between the user terminal 120 and the My Page management server 100 (the other processing unit) via the WWW page unit 114. First, when the user accesses the company's WWW page and presses the membership registration button on the WWW page displayed on the browser of the user terminal 120, the file of the membership registration screen is sent to the user terminal 120 by the WWW page unit 114, and the membership registration unit 109 is started up in the My Page management server 100. The user fills in his personal information in each item of the membership registration screen displayed on the browser, presses the send button provided on the membership registration screen (S301), and then sends the inputted data into the membership registration screen to the membership registration unit 109 via the WWW page unit 114 (S302). This processing will be explained below using specific examples as shown in FIG. 14 and FIG. 15.

Figure 14:
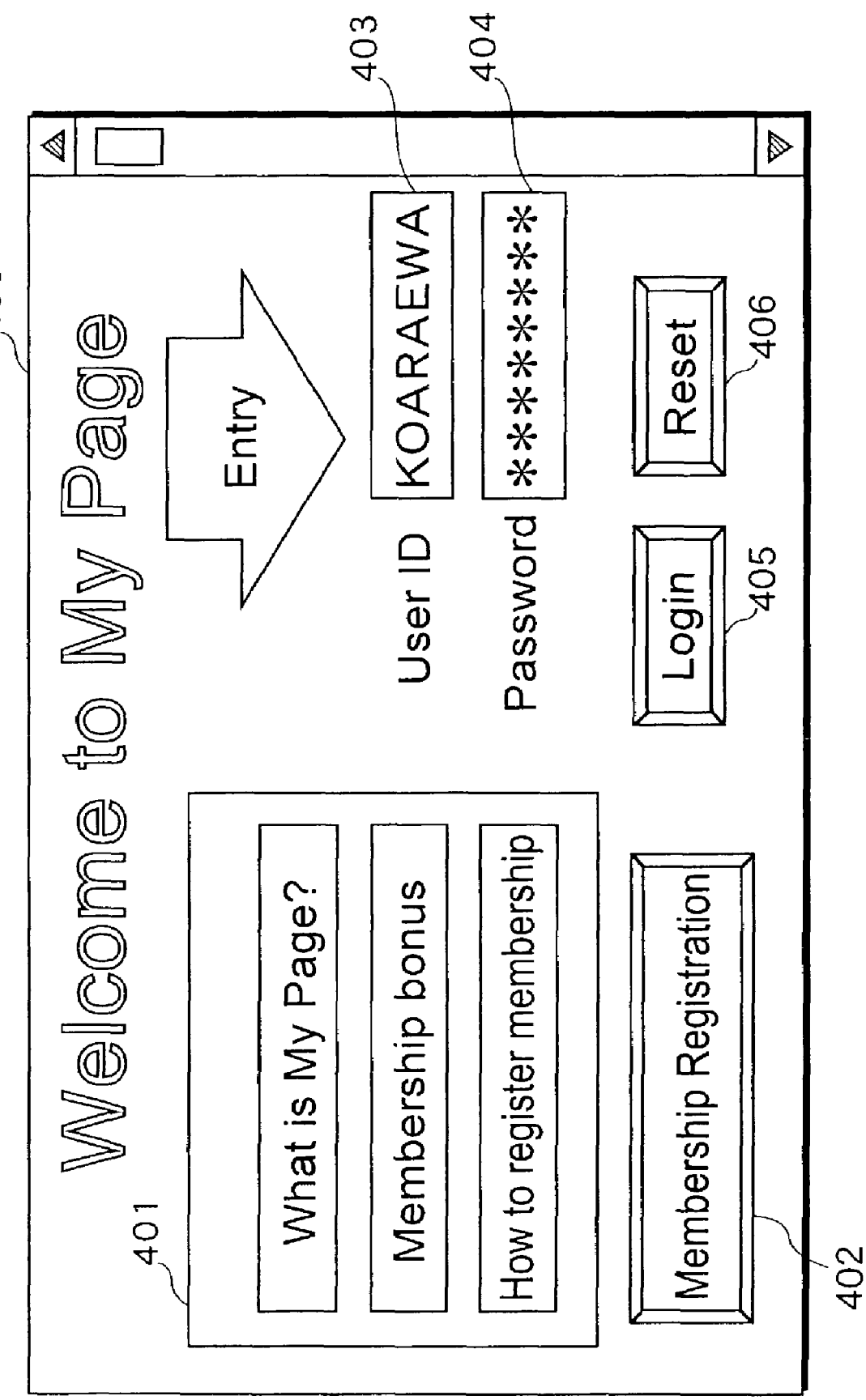
FIG. 14 is a diagram that shows a screen of "Welcome to My Page" which is a part of the company's WWW page for inviting a member of the My Page.

FIG. 14 is a diagram that shows the "Welcome to My Page" screen 400 which is a part of the company's WWW page for inviting a member of the My Page. On the "Welcome to My Page" screen 400, a link button 401 linked to a description page displaying descriptions of the My Page is provided. The description page includes a description of My Page, a description of a membership bonus, a description of how to register My Page membership, etc. At the bottom of the "Welcome to My Page" screen 400, there is a membership registration button 402 for starting the procedure for membership registration. When the user presses the membership registration button 402 for his membership registration, the file of the membership registration page is sent from the WWW page unit 114 to the user terminal 120, and the membership registration screen is displayed on the browser of the user terminal 120. When the membership registration is properly completed on the displayed membership registration screen, the user information 1500 of that user as shown in FIG. 2 is prepared in the My Page management server 100, and then the screen returns to the "Welcome to My Page" screen 400 again.

In the "Welcome to My Page" screen 400, a user ID input field 403, a password input field 404, a login button 405 and a reset button 406 are further provided. When the user who has registered his membership properly inputs his user ID and password set at the time of the membership registration in the user ID input field 403 and the password input field 404 and presses the login button 405, the user is authenticated by the authentication unit 115, and can access his own My page. When the input into the user ID input field 403 and the password input field 404 is wrong, the wrong entry is cleared by pressing the reset button 406, and the user can re-input into the user ID input field 403 and the password input field 404.

FIG. 15 is a diagram that shows the membership registration screen 500 for accepting membership registration to the My Page. On the membership registration screen 500, input fields for accepting the input of the user's personal information are provided. These fields include, for example, a name input field 501 for accepting the input of the user's name, a sex input field for accepting the input of the user's sex, a birth date input field 504 for accepting the input of the user's birth date, a zip code input field 505 for accepting the input of the user's zip code, an address input field 506 for accepting the input of the user's address, a search button 507 for searching for the address specified by the inputted zip code and filling the search result in the address input field 506, an occupation input field 508 for accepting the input of the user's occupation, an industry input field 509 for accepting the input of the industry including that occupation and a hobby input field 510 for accepting the input of the user's hobby.

Specific marks are put on the items such as the user's name, address and telephone number which are essential for specifying the member user, and the items such as the user's sex, birth date, occupation and hobby which are required for generating My Page, and an announcement 515 requesting the user to fill in all the items with a mark attached. At the bottom of the membership registration screen 500, a send button 513 for sending the information inputted into the above fields and a reset button 514 for clearing the information inputted into the above fields are provided. Furthermore, on the membership registration screen 500, a user ID setting input field 511 and a password setting input field 512 are provided. The user has set his own user ID and password in these fields, and inputs the user ID and password in the user ID input field 403 and the password input field 404, which are requirements for logging in the My Page, and thus the user's access to the My Page is authenticated.

When the user fills in at least the essential items on the above-mentioned membership registration screen 500 and presses the send button 513, the inputted personal information is sent to the WWW page unit 114 (S301 in FIG. 13), and the WWW page unit 114 notifies the membership registration unit 109 that the user has registered his membership (S302). In this example, the user's personal information inputted in each input field on the membership registration screen 500, that is, the name "Yukari Koara", the sex "female", the birth date "19640101", the zip code "540-6209", the address "Duo Apartment 2001, 1-1, Shiromi 2, Chuo-ku, Osaka", the occupation "company executive", the industry "forestry", the hobby "tree-climbing", the user ID "KOARAEWA", and the password "KOARA001" are sent to the WWW page unit 114.

Upon receiving the notice, the membership registration unit 109 assigns the system user ID "S00000001", for instance, to each user who has registered his membership, and stores the user's personal information acquired from the WWW page unit 114 in response to the membership registration in the customer database 101 along with the corresponding system user ID "S00000001" of the user (S303). As a result, the user information 1500 corresponding to the system user ID "S00000001" as shown in FIG. 2 is prepared. As shown in the left part of FIG. 13, the communication procedure between the user terminal 120 and the My Page management server 100 in the membership registration processing is complete.

After that, the user purchases the product of the company, and logs in the My Page to register the purchased product (S304). Specifically, when the browser of the user terminal 120 displays the "Welcome to My Page" screen 400 as shown in FIG. 14 from the WWW page of the company, the user properly inputs his user ID and password set at the time of his membership registration, "KOARAEWA" and "KOARA001", in the user ID input field 403 and the password input field 404, respectively, and presses the login button 405. The information inputted in the user ID input field 403 and the password input field 404 is then sent to the authentication unit 115 via the WWW page unit 114. After being authenticated by the authentication unit 115, the user can log in the My Page. During this processing, in the My Page management server 100, the authentication unit 115 collates the information inputted in the user ID input field 403 and the password input field 404 received from the user terminal 120 with the user ID 1502 and the password 1503 for authentication of the user information 1500 held in the customer database 101, and if both user IDs and passwords match, attaches the system user ID 1501 "S00000001" of that user information 1500 to the authentication result, and notifies the My Page generation unit 111 of this information. When the authentication unit 115 authenticates the user as the member of the My Page, the My Page generation unit 111 refers to the user information 1500 in the customer database 101 with the attached system user ID 1501 "S00000001" as a key, and reads out the user's personal information that meets the conditions for generating his My Page, because the type of the message part, the position on the My Page where the message part should be displayed, and the condition are predetermined. Furthermore, the My Page generation unit 111 extracts the parts of the message from the message database 104 with the read-out conditions as parameters, combines the extracted parts and generates the user's My Page. The My Page generation unit 111 attaches the system user ID 1501 "S00000001" of the corresponding user to the My Page generated as mentioned above, and sends the information to the WWW page unit 114. Upon receiving the information, the WWW page unit 114 sends the My Page to the user terminal 120 of the user, and the browser of the user terminal 120 displays it (S305). If the authentication unit 115 does not authenticate the user as the member of the My Page, the WWW page unit 114 sends the user terminal 120 the display requesting the user to re-input in the user ID input field 403 and the password input field 404.

Figure 16:
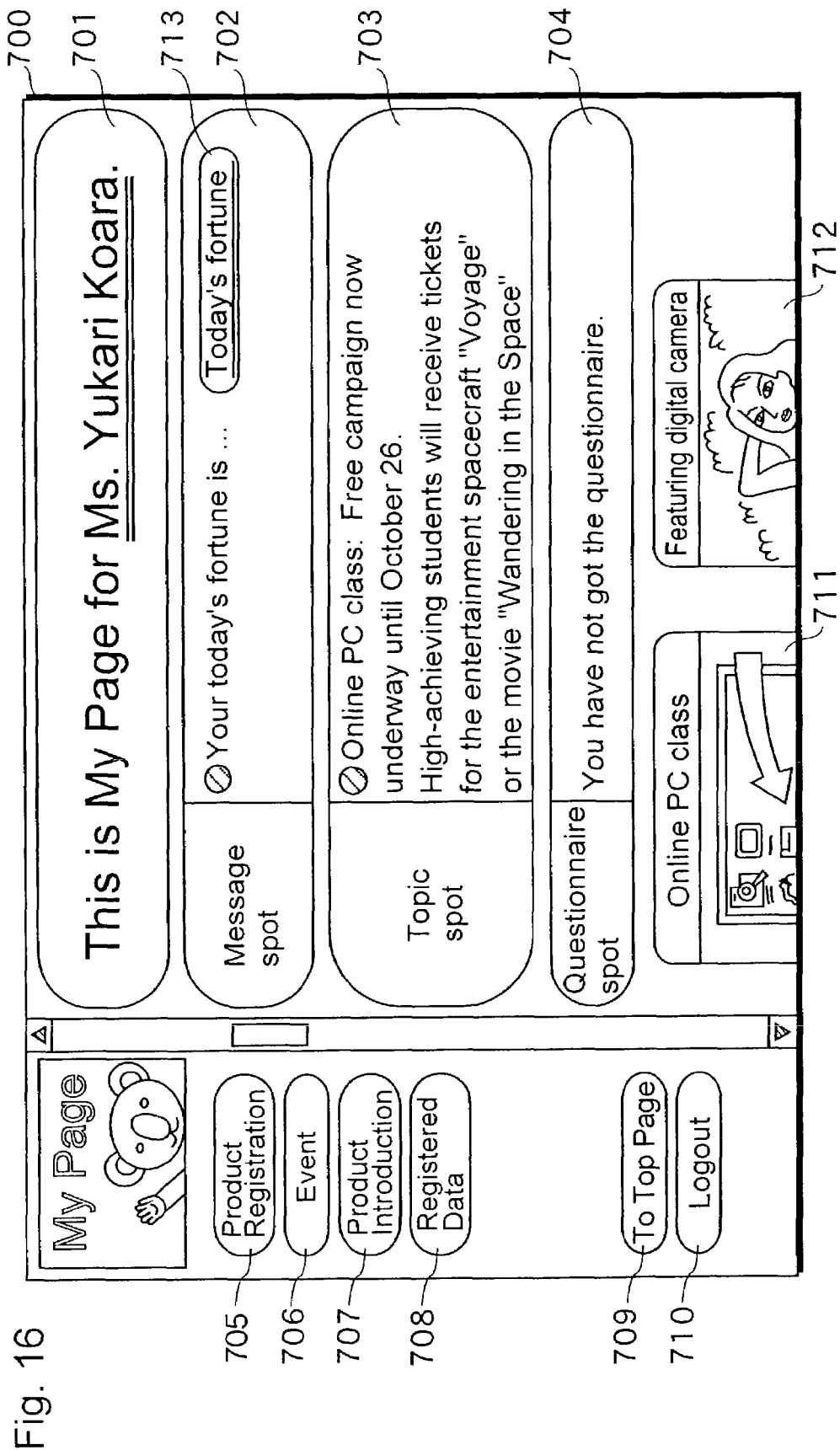
FIG. 16 is a diagram that shows a My Page screen (without a link indicator) generated by the My Page generation unit as shown in FIG. 1.

FIG. 16 is a diagram that shows the screen of the My Page (without a link indicator) generated by the My Page generation unit 111 as shown in FIG. 1. The My Page screen (without a link indicator) 700 has a right frame and a left frame, and the title 701 with the user's name indicating the user's personal page is provided in the right frame. This title 701 is created as follows. The text "This page is My Page for Mr. (Ms.)" which is common to all the titles 701 is placed in the title box of predetermined color and shape or selected based on the conditions included in the user's personal information with text or illustration letters of a predetermined font, color, size and shape or selected based on the conditions of the user's personal information, and the user's name, "Yukari Koara", for instance, which is read out from the customer database 101 by the My Page generation unit 111, is placed following the above text.

In the right frame of the My Page screen 700, a message spot 702, a topic spot 703, a questionnaire spot 704, etc. are placed, and below them, an event spot button 711 that indicates a link to a page for detailed information of currents events, a feature spot button 712 that indicates a link to a page for special features, etc. are placed.

The message spot 702 is the personal message for each user selected based on the conditions included in the user's personal information. The My Page generation unit 111 extracts the parts of the message corresponding to the user's personal information from the message database 104 with reference to the condition setting database 103, combines the extracted parts and creates this message spot 702.

Specifically, when the message is created in the message spot 702, the parts of the message are extracted from the message database 104 in an order of descending priorities of the conditions included in the personal information, and combined. For example, when an event individual to the user corresponding to the system user ID 1501, such as his birthday or his winning a lottery, occurs, the parts of the corresponding message are extracted and combined so as to create the message. When an event individual to the user does not occur, an announcement of fortune-telling, "Your today's fortune is . . . ", for instance, if the user is a woman, is combined with a link button 713 which indicates a link to a page for the user's fortune of that day, so as to create the message spot 702.

The My Page generation unit 111 refers to the sex 1506 of the user information 1500, and reads out the data "2 (female)". Since the actual value of the read-out sex 1506 is "2 (female)", the My Page generation unit 111 extracts the message selection condition 1700, that is, the condition type 1701 "sex" and the condition value 1702 "female", from the condition setting database 103, and reads out the message ID 1703 "M00000010" from the extracted message selection condition 1700. Then, the My Page generation unit searches the message database 104 with the read-out message ID 1703 "M00000010" as a key, and pastes the text "Your today's fortune is . . . " and the image "M00000010.jpg" described in the message text 1801 and the image 1802 of the message part 1800 to the message spot 702 on the My Page screen, so as to create the message spot 702. In the same manner, if the user is a man, an announcement of economic information (not shown in the figures), "Today's economic situation is . . . ", for instance, is combined with a link button indicating a link to a page for the economic situation of that day, so as to create the message spot 702.

The event information that is an announcement of an event common to all users is read out from the event database 108 and pasted, and thus the topic spot 703 is created. The questionnaire spot 704 is an area where an announcement requesting the user to answer the questionnaire of each product and the corresponding link button are created when there is a product questionnaire corresponding to the user. If there is no product questionnaire for the user, the announcement indicating that there is no questionnaire, "You've got no questionnaire", for instance, is created. Furthermore, the event spot button 711 and the feature spot button 712 are created when images such as photographs and animations that clearly indicate the contents of the event page and the feature page and appeal to the user are pasted there. In addition, the column article common to all users and others (not shown in the figures) are displayed on the My Page screen 700.

At the upper part of the left frame of the My Page screen 700, a product registration button 705 which is a link to the product registration screen, an event button 706 which is a link to the detailed page of the event, a product introduction button 707 which is a link to the product introduction page introducing each product in more detail, a registered data button 708 which is a link to the registered product data list page indicating the personal information registered by the user and the purchased product, etc. are provided. At the lower part, a WWW page button 709 which is a link to the WWW page, a logout button 710 which is a link to a command for exiting the display of the My Page by notifying the WWW page unit 114 of the logout from the My Page, etc. are provided.

When the user presses the product registration button 705 on the My Page screen (without a link indicator) 700, the HTML file describing the product registration screen is read out from the WWW page unit 114 according to the link placed to the product registration button 705 and sent to the user terminal 120. Then, the product registration unit 110 is started up by the WWW page unit 114, and the product registration unit 110 starts the product registration processing.

Figure 17:
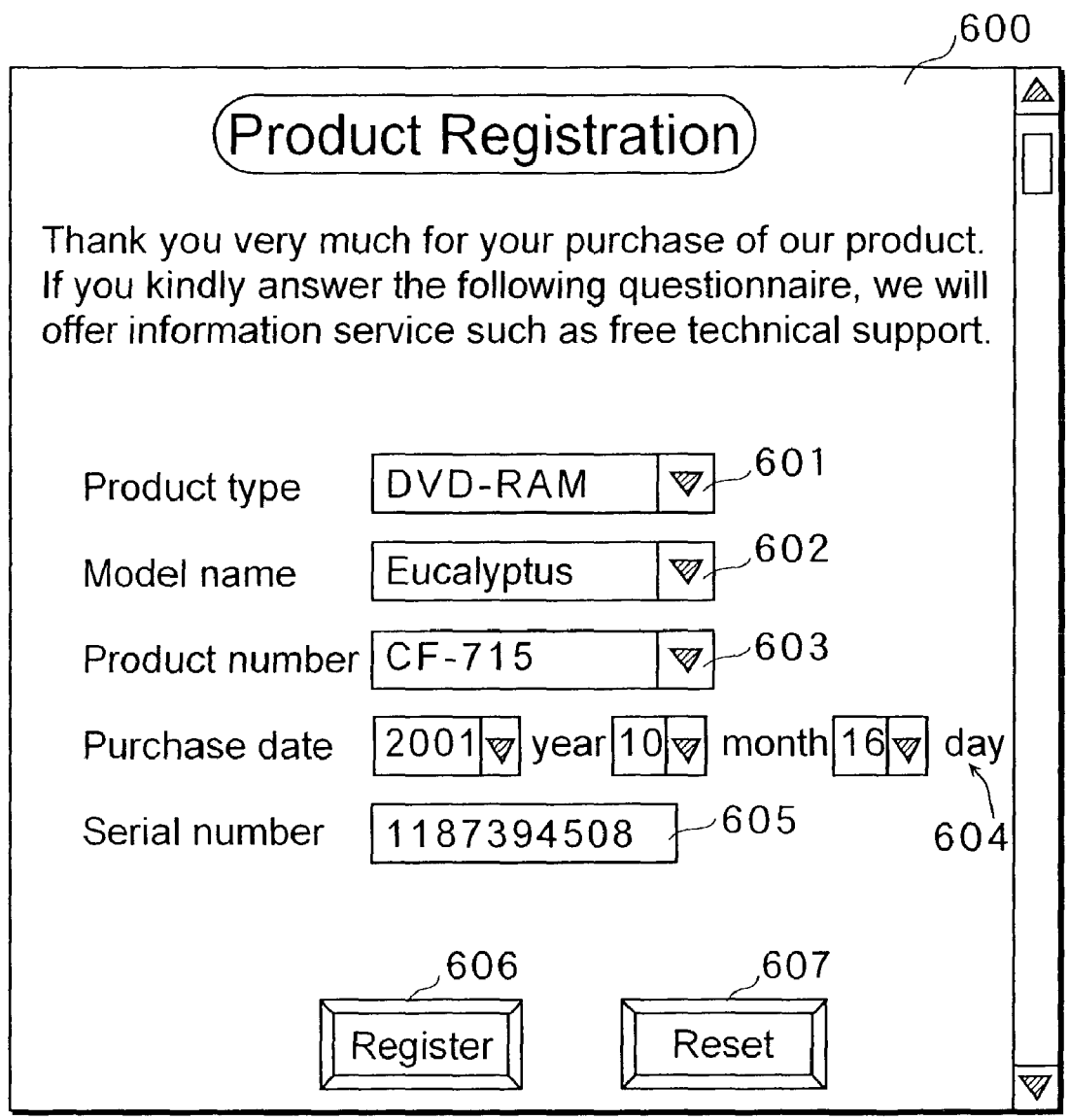
FIG. 17 is a diagram that shows a product registration screen for accepting registration of a product purchased by a user who is a member of the My Page.

FIG. 17 is a diagram that shows the product registration screen for accepting the registration of the product purchased by the user who is a member of the My Page. On the product registration screen 600, input fields for accepting inputs of product information specifying the product purchased by the user, such as a product type input field 601 for accepting the input of the product type purchased by the user, a TV, a video recorder, a digital camera, a personal computer, a cellular phone, etc., for instance, a model name input field 602 for accepting the input of the product model name, a product number input field 603 for accepting the input of the product number, a serial number input field 605 for accepting the input of the serial number, etc., are provided.

Furthermore, at the lower part of the product registration screen 600, a registration button 606 for sending the product registration data inputted in each above field to the product registration unit 110 and a reset button 607 for clearing the data inputted in each above field are provided.

As described above, according to the present embodiment, there is no input field for requesting the personal information for specifying the user on the product registration screen 600. This is because the product registration screen 600 is invoked from the My Page that is never created before the user is authenticated with his user ID 1502 and password 1503 for logging in the My Page, so the user who is to register the product on this screen has been specified in the product registration unit 110, and thus, there is no need to request the user to input his personal information at every product registration. The personal information needs to be transmitted under tight security control. According to the present embodiment, the personal information is transmitted only once at the time of member registration. Therefore, the user can omit an operation of inputting his personal information such as his address, name and telephone number every time he registers a product, and thus the number of transmissions of the personal information can be minimized. As a result, the information security is improved.

When the user inputs the product registration data of the product purchased by the user, such as the product type 601 "DVD-RAM", the model name 602 "Eucalyptus", the product number "CF-715", the purchase date 604 "20011016" and the serial number 605 "1187394508" in the above-mentioned input fields and presses the registration button 606 on the product registration screen 600 (S306 in FIG. 13), the inputted product registration data is sent back to the product registration unit 110 via the WWW page unit 114 (S307). The product registration unit 110 reads out the questionnaire ID 1520 "A00000004" of the questionnaire corresponding to the product based on the product number 603 "CF-715" among the product registration data, from the product master database 116, and stores the read-out questionnaire ID 1520 "A00000004" in the user information 1500 specified with the system user ID 1501 "S00000001" of the user. Furthermore, the product registration unit 110 stores the product registration data whose input is accepted in the purchased product database 102 along with the corresponding system user ID 1501 "S00000001" of the user, and sends the notice to be displayed indicating the completion of the product registration to the user terminal 120 via the WWW page unit 114. The user then logs out here, for example. As shown in the left side of FIG. 13, the communication procedure between the user terminal 120 and the My Page management server 100 in the product registration processing is complete.

When the user who has once logged out properly logs in (S308) and receives that notice from the authentication unit 115, the My Page generation unit 111 starts up the link generation unit 112, and generates the My Page of the user (whose system user ID 1501 is "S00000001"). Once started up, the link generation unit 112 generates a description for displaying a link button at a predetermined position on the My Page screen, in the My Page file in HTML. Specifically, the My Page generation unit 111 reads out the questionnaire ID 1520 "A00000004" for identifying the unanswered product questionnaire from the user information 1500 of the customer database 101, embeds the questionnaire generation command based on the read-out questionnaire ID 1520 "A00000004" on the back of the link button, and updates the My Page (S309).

Figure 18:
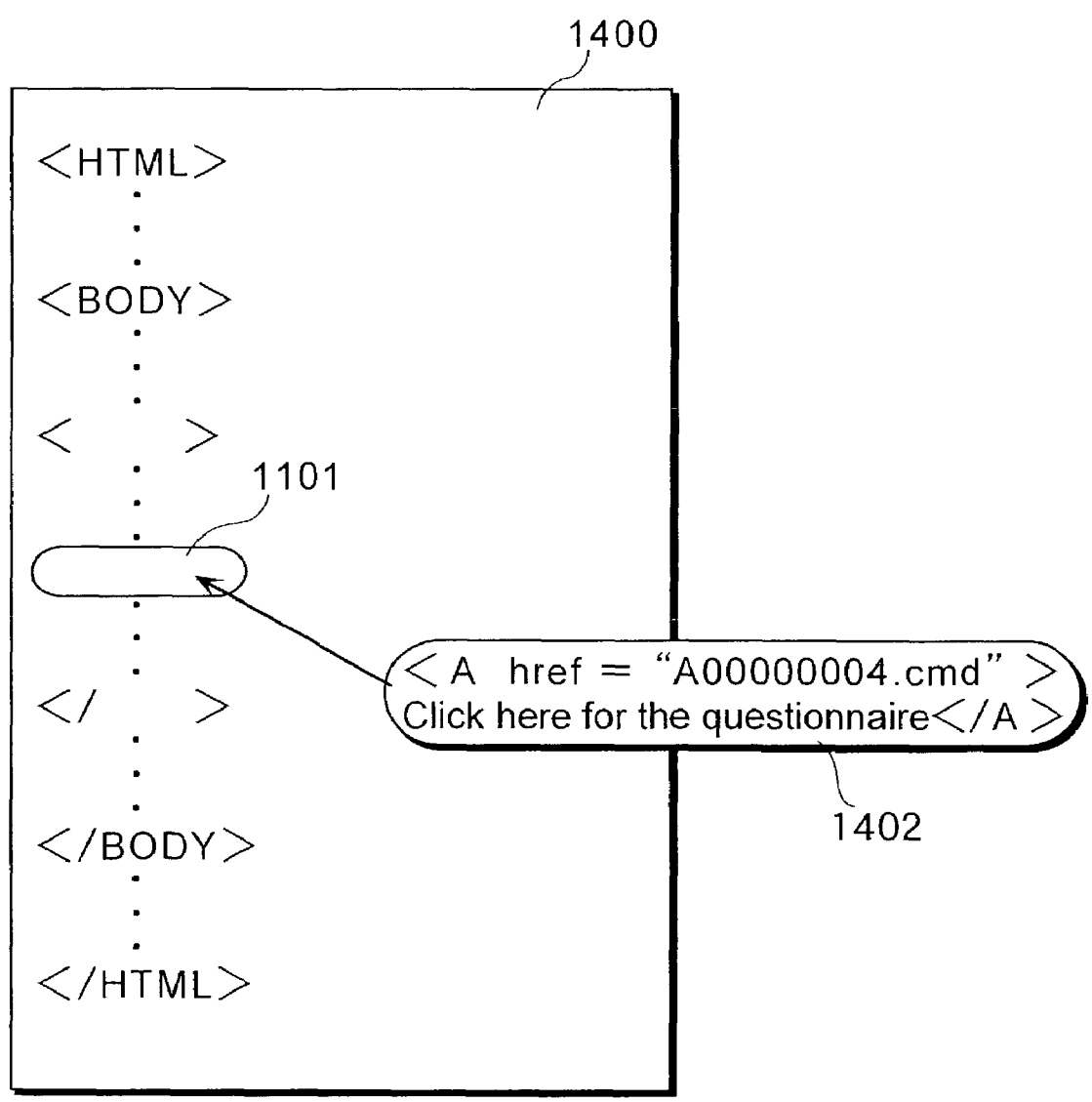
FIG. 18 is a diagram that shows relationship between a code generated by the link generation unit as shown in FIG. 1 and source data for the My Page screen (without a link indicator).

FIG. 18 is a diagram that shows a relationship between a code 1402 generated by the link generation unit 112 as shown in FIG. 1 and source data 1400 for the My Page screen (without a link indicator) 700. The My Page screen (without a link indicator) 700 is generated as an HTML file containing the source data as shown in FIG. 18. The source data is described with tags and text as is generally known. The link generation unit 112 generates the command name "A00000004.cmd" based on the questionnaire ID 1520 "A00000004" of the corresponding product, and further reads out the text "Click here for the questionnaire" from the message database 104 and generates a code 1402 that is a combination of the command name and the text, specifically, a tag indicating "A href="A00000004.cmd" Click here for the questionnaire/A. The link generation unit 112 inserts the code 1402 into a predetermined position 1101 on the source of the My Page screen (without a link indicator) 700, and generates a link to the generated link button. The code 1402 indicates a link to the command file prepared under the name of "A00000004.cmd", and the code "A00000004" for generating the product questionnaire in the product questionnaire management unit 113 is described in this command file. In other words, when the user presses this link button, the command file "A00000004" opens, and the product questionnaire management unit 113 starts generating the product questionnaire "A00000004".

On the other hand, the My Page generation unit 111 generates a message indicating that the user has the product questionnaire on his My Page by combining the parts of the message in the message database 104, and updates the My Page (S310 in FIG. 13).

The WWW page unit 114 sends the updated My Page file to the user terminal 120, and the browser of the user terminal 120 displays the updated My Page (S311).

Figure 19:
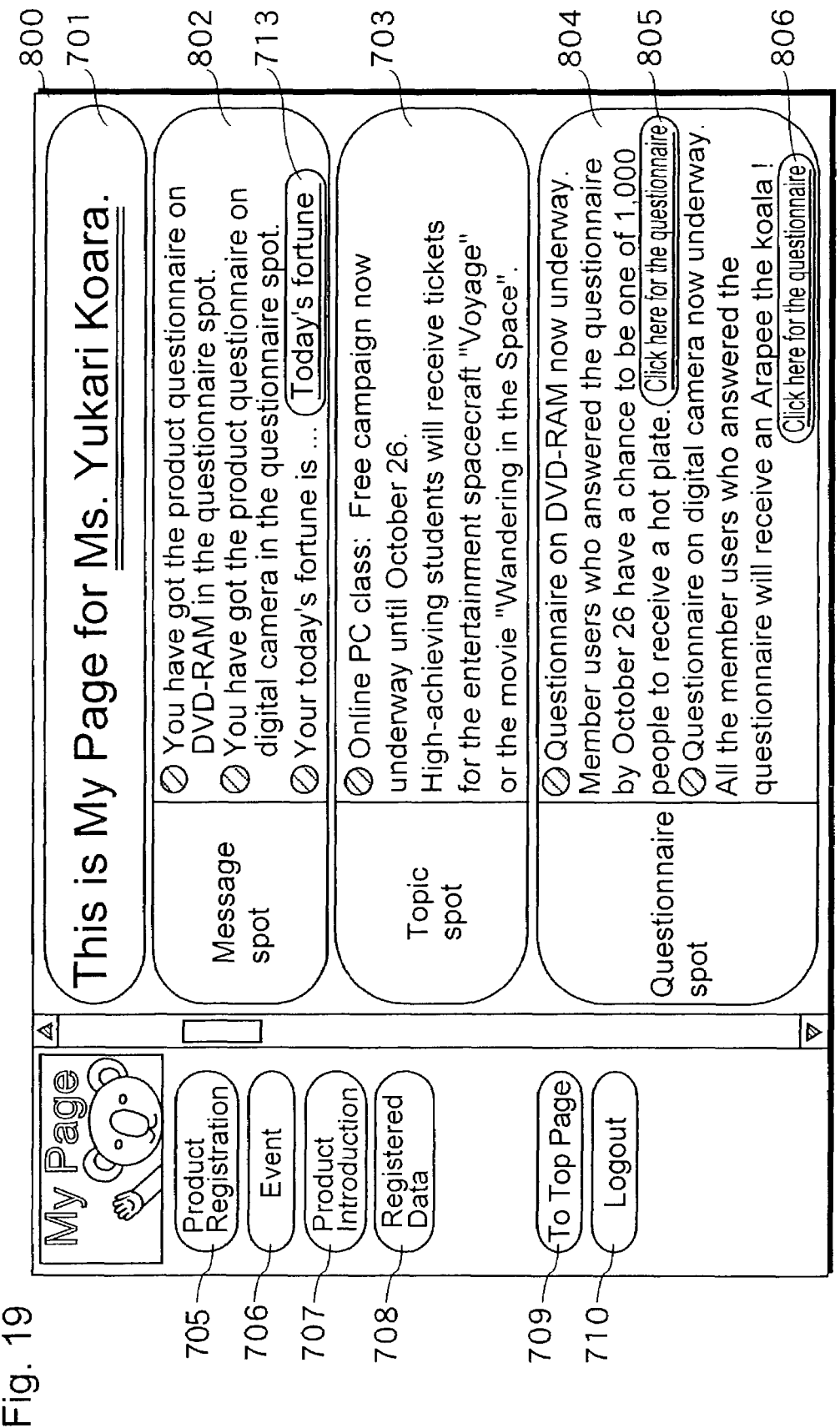
FIG. 19 is a diagram that shows a My Page screen (with a link indicator) updated by the My Page generation unit as shown in FIG. 1.

FIG. 19 is a diagram that shows the My Page screen (with a link indicator) 800 updated by the My Page generation unit 111 as shown in FIG. 1. Note that the components similar to those of the My Page screen 700 (without a link indicator) are assigned with the identical reference numbers and their detailed explanation are omitted.

The message spot 802 on the My Page screen 800 (with a link indicator) is the message spot 702 in FIG. 16 which has been updated by the My Page generation unit 111 according to the notice from the product registration unit 110. In the message spot 802, the announcement is displayed, indicating that the user has the product questionnaire on his My Page, "You have got the product questionnaire on DVD-RAM in the questionnaire spot" and "You have got the product questionnaire on digital camera in the questionnaire spot". This announcement is created by inserting the text "DVD-RAM" of the product type 601 which is inputted by the user on the product registration screen between the text "You have got the product questionnaire on" and the text "in the questionnaire spot" which are read out from the message database 104 by the My Page generation unit 111. The announcement "You have got the product questionnaire of digital camera in the questionnaire spot" is also created based on the input onto the product registration screen 600 (not shown in the figures).

In the questionnaire spot 804 on the My Page screen (with a link indicator) 800, the announcement urging the user to answer the questionnaire of the DVD-RAM, "Questionnaire on DVD-RAM now underway! . . . have a chance to receive . . . ", and the link button 805 generated by the link generation unit 112 are displayed. Also, below them, the announcement of urging the user to answer the questionnaire of the digital camera, "Questionnaire on digital camera now underway! . . . will receive an Arapee the koala!", and the link button 806 generated by the link generation unit 112 are displayed. Both announcements urging the user to answer the questionnaires are generated by the My Page generation unit 111 in the same manner as the announcements in the message spot 802. In this case, the questionnaire generation command directing the product questionnaire management unit 113 to generate the product questionnaire (the questionnaire ID 1520 "A00000004") on the DVD-RAM registered by the user is embedded in the back of the link button 805. Furthermore, the questionnaire generation command directing the product questionnaire management unit 113 to generate the product questionnaire (the questionnaire ID 1520 "A00000001") on the digital camera registered by the user on the product registration screen 600 (not shown in the figures) is embedded in the link button 806.

When the user presses the link button 805 on the My Page screen 800 (with a link indicator) (S312 in FIG. 13), the questionnaire generation command is sent to the product questionnaire management unit 113 via the WWW page unit 114 (S313), the page for the product questionnaire specified with the questionnaire ID is generated by the product questionnaire management unit 113 (S314). Specifically, the product questionnaire management unit 113 reads in the questionnaire items stored in the questionnaire item database 105, pastes the read-in questionnaire items on the questionnaire page, and then generates the product questionnaire. Also, the product questionnaire management unit 113 has a send button for the user to send the questionnaire answer at the bottom of the product questionnaire. The product questionnaire generated by the product questionnaire management unit 113 is sent to the user terminal 120 via the WWW page unit 114, the page for the product questionnaire is displayed on the browser of the user terminal 120 (S315).

FIG. 20 is a diagram that shows the screen 900 of the product questionnaire on DVD-RAM generated by the product questionnaire management unit 113 as shown in FIG. 1. On the top 901 of the product questionnaire screen 900, the title of this page, "Product Questionnaire on DVD-RAM", for instance, and the greeting of thanking the user for purchasing the product, "Thank you very much for your purchase of our DVD-RAM. We would like to develop our new products based on your answer to the following questionnaire.", for instance, are placed. These phrases displayed on the top 901 of the page are the text common to all the questionnaires except "DVD-RAM", and are stored in the questionnaire item database 105. The product questionnaire management unit 113 inserts the text "DVD-RAM", which is specified with the questionnaire ID 1520 "A00000004" in the product master 2300 and read out from the product master database 116 into the corresponding place of the text read out from the questionnaire item database 105, and creates the announcement on the top 901 of the product questionnaire screen 900.

Furthermore, on the product questionnaire screen 900, the question items such as a usage type 902 for asking the user about his product usage type, an intended use 903 for asking the user about his primary intended use of the product, an announcement 904 urging the user who answered "business use" in the intended use 903 to answer the next question, an industry 905 for asking the user's industry where the product is used for, and others are displayed. This product questionnaire screen 900 is generated by the product questionnaire management unit 113 by reading out the question items depending on the attributes and the uses of each product from the questionnaire item database 105 and combining them.

In the lower part of the product questionnaire screen 900, a return (cancel) button 909, store and return button 910, a reset button 907, a send button 908, etc. are provided. The return (cancel) button 909 is a link to the page displayed just before the product questionnaire screen 900. The return (cancel) button 909 has a function of, upon being clicked on the browser, displaying the linked page, without sending answer data to the WWW page unit 114 even if the user inputs any answers on the displayed product questionnaire screen 900.

The store and return button 910 has a function of attaching a flag indicating that the input of the answer to the product questionnaire has not yet been completed, having the browser of the user terminal 120 send the questionnaire result which has been inputted to the WWW page unit 114 to have it stored in the questionnaire result database 106 temporarily, and having the browser display the page displayed just before the product questionnaire screen 900. As described above, since the flag indicating that the input of the answer to the product questionnaire has not yet been completed is attached, the sent questionnaire result is stored in the product questionnaire management unit 113. In addition, the flag can prevent the product questionnaire management unit 113 from clearing the questionnaire ID 1520 of the product questionnaire from the customer database 101.

Accordingly, when the user presses the store and return button 910 on the product questionnaire screen 900, the result of the questionnaire which has been inputted is sent to the WWW page unit 114. Upon receiving the result, the WWW page unit 114 transfers the questionnaire result with the flag indicating that the input of the answer has not yet been completed being attached and the system user ID 1501 of the answerer to the product questionnaire management unit 113. Upon receiving the questionnaire result, the product questionnaire management unit 113 stores it in the questionnaire result database 106.

In the above case, when the link button is pressed again, the product questionnaire management unit 113 reads in the questionnaire result stored in the questionnaire result database 106, and generates the file of the product questionnaire screen which fits the read-in questionnaire result in the corresponding input fields and displays it. However, the product questionnaire management unit 113 does not always need to generate the file of the product questionnaire. For example, when the product questionnaire management unit 113 acquires the questionnaire result with the flag indicating that the input of the answer to the questionnaire has not yet been completed being attached, it may store the file of the product questionnaire in which the questionnaire result is filled in the corresponding input fields in the memory area of the WWW page unit 114, and rewrite the questionnaire generation command embedded in the link button of the My Page into the link indicator whose link leads to the file of the product questionnaire stored in the memory area of the WWW page unit 114. Also, a case where the store and return button 910 is provided has been explained above, but this button does not always need to be provided. If the logout button has the above-mentioned function, for example, the same result can be obtained.

Accordingly, the user can disconnect, move to a site of another server, or have the user terminal 120 perform another processing underground during the answering of the product questionnaire, so when he presses the link button of the product questionnaire a next time, he can answer only the unanswered questions with reference to the questionnaire result which has already been inputted the last time. Therefore, it does not take the user much time to answer the product questionnaire, and he can take the appropriate time at his convenience. Therefore, the present invention is convenient. As a result, there is an effect that the My Page management server 100 can collect the product questionnaire results in a more friendly fashion from the users.

The reset button 907 is linked to a command for invoking the function of the product questionnaire management unit 113 of clearing the answers to the product questionnaire items and accepting the re-input of the answers. The send button 908 has a function of sending the answer data whose input is accepted on the product questionnaire screen 900 on the user terminal 120. When the user presses the send button 908 (S316 in FIG. 13), the answer data whose input is accepted on the product questionnaire screen 900 is sent to the WWW page unit 114 with the system user ID 1501 attached (S317). The user may log out here. As a result, the product questionnaire management unit 113 that has acquired the answer data via the WWW page unit 114 stores the answer data in the questionnaire result database 106, sets a flag indicating that the answer to the product questionnaire has been completed, and clears the questionnaire ID 1520 of the product questionnaire described on the user information 1500 in the customer database 101. This is the communication procedure between the user terminal 120 and the My Page management server 100 in the questionnaire answer processing.

When the user presses the send button 908 on the product questionnaire screen 900 or the user who has logged out logs in properly again, the My Page generation unit 111 starts up the link generation unit 112 and generates a new My Page. The started-up link generation unit 112 refers to the questionnaire ID 1520 of the unanswered product questionnaire in the user information specified with the system user ID in the customer database 101, and does not generate the link button for the answered product questionnaire on DVD-RAM. In this event, the link generation unit 112 clears the link button 805 to the product questionnaire on DVD-RAM from the My Page screen (with a link indicator) 800 corresponding to the user before the user answers the questionnaire on DVD-RAM (S318).

In response, the My Page generation unit 111 does not generate the announcement for the message spot 802 corresponding to the cleared link button 805, "You have got the product questionnaire on DVD-RAM in the questionnaire spot", and the announcement urging the user to answer the product questionnaire on DVD-RAM in the questionnaire spot 804, "Questionnaire on DVD-RAM now underway! . . . have a chance to receive . . . ". This means that the My Page generation unit 111 has cleared the announcements from the message spot 802 and the questionnaire spot 804.

Figure 21:
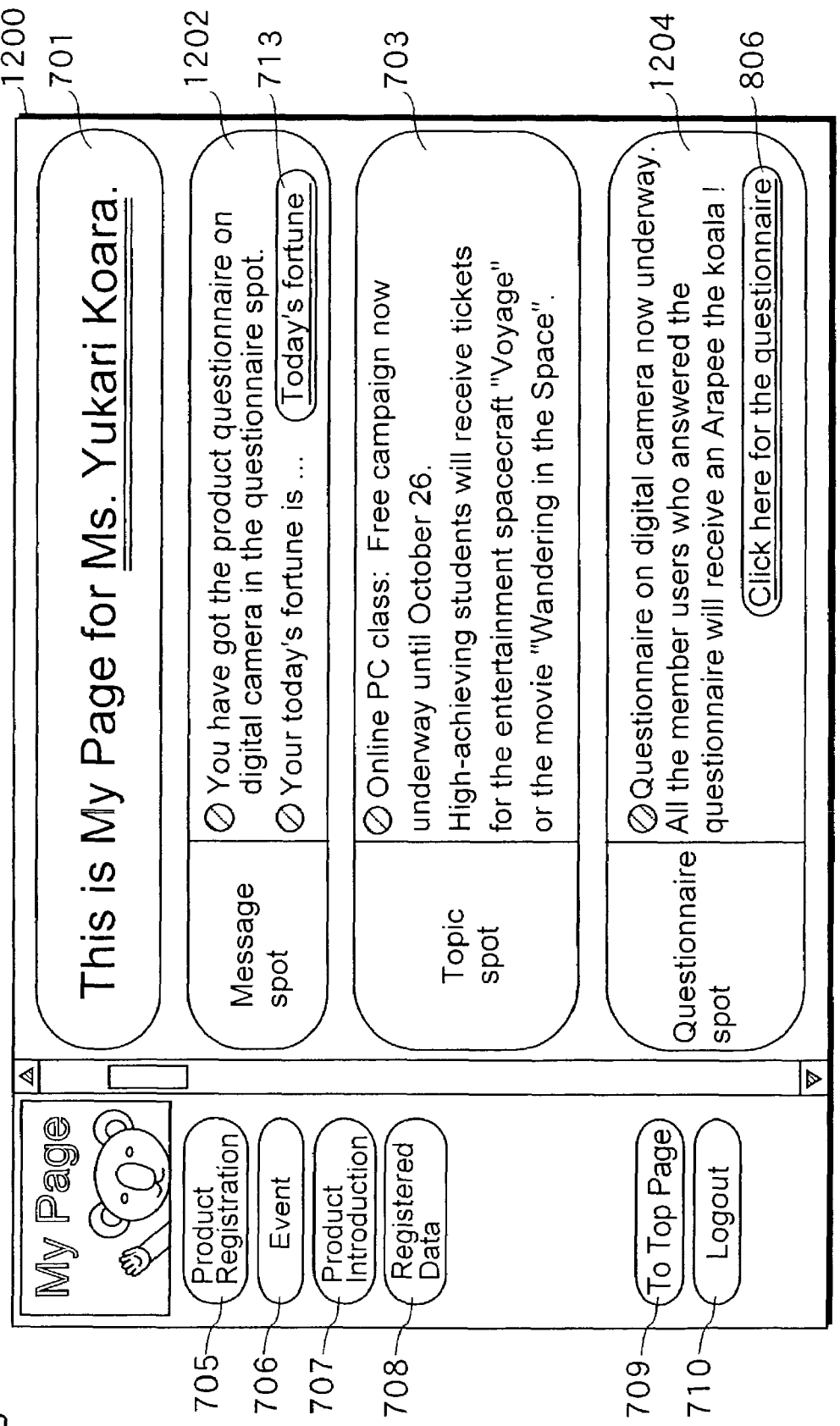
FIG. 21 is a diagram that shows the My Page screen on which the link button to the DVD-RAM Product Questionnaire is cleared from the My Page screen (with a link indicator) as shown in FIG. 19.

FIG. 21 is a diagram that shows the My Page screen 1200, which is cleared of the link button 805 to the product questionnaire of the DVD-RAM from the My Page screen (with a link indicator) 800 as shown in FIG. 19. As a result of the user answering the product questionnaire on the DVD-RAM on the screen 900 as shown in FIG. 20 and performing the sending operation, the link button 805 on the My Page screen (with a link indicator) 800 as shown in FIG. 19 was cleared. In response to this, both the announcement on the message spot 802 corresponding to the cleared link button 805 and the announcement urging the user to answer the product questionnaire on the DVD-RAM on the questionnaire spot 804 have also been cleared.

In the message spot 1202 on the My Page screen 1200, the announcement of the unanswered product questionnaire on the digital camera (the questionnaire ID 1520 "A00000001") and the announcement of today's fortune are displayed. Also, in the questionnaire spot 1204, the announcement urging the user to answer the product questionnaire on the digital camera "Questionnaire on digital camera now underway! . . . will receive an Arapee the koala." and the link button 806 generated by the link generation unit 112 are displayed.

FIG. 22 is a diagram that shows the screen of the questionnaire on digital camera 1300 which is linked to the link button 806 displayed on the My Page screen 1300 as shown in FIG. 21. Note that, on the product questionnaire screen 1300, the buttons having the same functions as those on the product questionnaire screen 900 are assigned with the same reference numbers, and the detailed explanation of them will be omitted.

On the top 1301 of the product questionnaire screen 1300 (the questionnaire ID 1520 "A00000001"), the greeting thanking the user for purchasing the product is displayed which is created by the product questionnaire management unit 113 in the same manner as the greeting displayed on the top 901 of the product questionnaire screen 900. Also, on the other parts of the product questionnaire screen 1300, the question items on the digital camera are displayed according to the questionnaire 1900 in the questionnaire item database 105 specified by the questionnaire ID 1520 in the customer database 101. Specifically, the question items such as a complaint item 1302, a subject item 1303 and a function item 1304 are displayed. The complaint item 1302 asks for the user's complaint in using the purchased product by the text of the questionnaire question 1902, "What is your complaint in using the product? . . . ", corresponding to the questionnaire question number 1901 "001" of the questionnaire 1900 as shown in FIG. 6. The subject item 1303 asks what subject the user wants to shoot with the digital camera by the text of the questionnaire question 1902, "What do you want to shoot? . . . ", corresponding to the questionnaire question number 1901 "002" of the questionnaire 1900. The function item 1304 asks for the user's needs for the function of the digital camera by the text of the questionnaire question 1902, "Do you need any other function? . . . ", corresponding to the questionnaire question number 1901 "003".

On this product questionnaire screen 1300 as mentioned above, when the user inputs the answers to the above questions, for instance, "2" (startup time) and "3" (size/weight) for the complaint item 1302, "1" (my pet) and "2" (travel) for the subject item 1303, and "6" (voice recording) for the function item 1304, and presses the send button 908, the answer data inputted to the product questionnaire screen 1300 is sent to the product questionnaire management unit 113 via the WWW page unit 114. This answer data is stored in the questionnaire result database 106 as a questionnaire result 2000 by the product questionnaire management unit 113, and at the same time, the flag "1" indicating the completion of the answer to the product questionnaire (the questionnaire ID 1520 "A00000001" is described in the answer completion flag 2002 in the questionnaire result 2000 and that date "20020403" is described in the questionnaire answer date 2003, respectively, and the questionnaire ID 1520 "A00000001" described in the user information 1500 in the customer database 101 is cleared. Furthermore, the link button 806 on the My Page screen 1200 which is linked to the product questionnaire screen 900 is cleared. In response to that, the My Page generation unit 111 generates a new My Page in which the announcement to the digital camera questionnaire in the message spot 1202 "You have got the product questionnaire on digital camera in the questionnaire spot." and the announcement urging the user to answer the digital camera questionnaire in the questionnaire spot 1204 "Questionnaire on digital camera now underway . . . will receive an Arapee the koala." are cleared. As a result, as long as a new event or a new product registration has not occurred since the My Page screen (without a link indicator) 700 as shown in FIG. 16 was displayed, the screen same as the My Page screen (without a link indicator) 700 as shown in FIG. 16 is displayed again.

Although the above explanation is made on the assumption that the file such as My Page is an HTML file in the present embodiment, it may be a JSP file or an ASP file including a command (tag), a script and a code specific to the above-mentioned application server in the HTML file.

The My Page management server 100 according to the present embodiment does not store the product questionnaire including a lot of items common to all products in the database as it is, but stores the divided parts of the questionnaire items in the questionnaire item database 105, and reads out the parts from the questionnaire item database 105 after the product questionnaire is called up and then generates the product questionnaires dynamically. Accordingly, there is an effect that the memory area of the My Page management server 100 can be saved.

Also, since each user registers the product on his own My Page according to the My Page management server 100 of the present invention, he does not need to input his own personal information over and over every time he purchases and registers a new product. Accordingly, there is an effect that the input load on the user can be lightened.

Although the present embodiment is configured to operate the product registration on the user's personal My Page, it may be configured to operate on the common page as shown in FIG. 14. In this case, if it is configured to input the information such as a user ID for specifying an individual, it becomes possible to register the data into the customer database 102 in the same manner as the above embodiment.

Although the product questionnaire management unit 113 generates the product questionnaire dynamically after the link button to the product questionnaire is pressed, the product information management device according to the present invention is not limited to this. By having generated the product questionnaire corresponding to each product and stored it in the database beforehand, when the link button to the product questionnaire displayed on the My Page is pressed, the product questionnaire management unit 113 may read out the file of the corresponding product questionnaire from the database, and send the read-out product questionnaire file to the user terminal 120 via the WWW page unit 114 so as to have the browser of the user terminal 120 display it.

Figure 23:
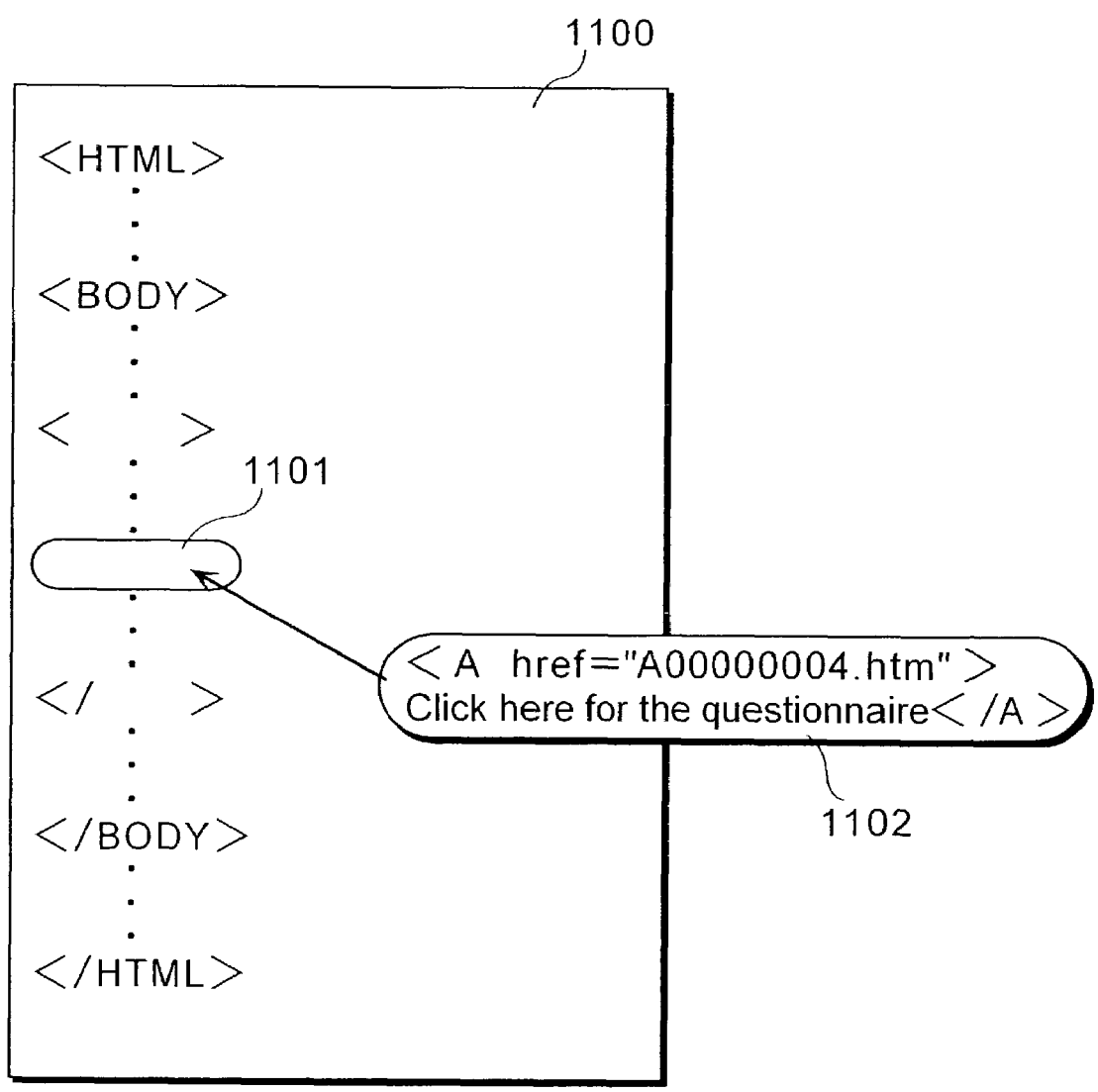
FIG. 23 is a diagram that shows another source data for the My Page screen (with a link indicator) used when the link generation unit generates the link indicator using another code.

FIG. 23 is a diagram that shows another source data 1100 for the My Page screen (with a link indicator) 800 used when the link generation unit 112 generates the link indicator using another code 1102. The My Page screen (with a link indicator) 800 in the case where a link indicator is generated using the other code 1102 is generated in the HTML file whose source data 1100 is indicated as shown in this figure, and described with tags and text as is generally known. The link generation unit 112 generates the file name of the corresponding product questionnaire "A00000004.htm" based on the questionnaire ID 1520 of the product questionnaire "A00000004", and further reads out the text "Click here for the questionnaire" from the message database 104 and generates the code 1102 which is a combination of the file name and text, "A href='A00000004.htm' Click here for the questionnaire/A, for instance. The link generation unit 112 inserts the code 1102 into a predetermined place 1101 of the source data for generating the My Page screen (without a link indicator) 700, and generates a link indicator to the product questionnaire file which has been prepared beforehand under the name of "A00000004.htm".

Although the My Page is dynamically generated when the user logs in properly in the present embodiment, the product information management device, that is, My Page management server 100, according to the present is not limited to this. The My Page may have been created beforehand as an HTML file and be stored in the memory area of the WWW page unit 114.

In the above embodiment, only the case where the link generation unit 112 clears a link indicator to the product questionnaire due to the completion of the answer to the product questionnaire has been explained, but the present invention is not limited to this. For example, the link generation unit 112 refers to not only the customer database 101 but also the questionnaire item database 105 and the product master database 116 every time it is started up by the My Page generation unit 111. As a result, even if the questionnaire ID 1520 is described as an unanswered questionnaire in the user information 1500, the link generation unit 112 does not need to generate a link indicator to the product questionnaire, when (1) the present date has passed the display ending date 1905 described in the questionnaire 1900 of that questionnaire ID 1520, (2) the present date has passed the production ending date 2305 of the product master 2300 which is a hit with the questionnaire ID 1520 as a key, or (3) the present date has passed the sale ending date 2306 of the product master 2300. Also, when an operator wants to clear a link indicator due to the end of the monitoring period, etc., the operator may describe the monitoring period ending date in the display ending date 1905 of the questionnaire 1900 using the edit inputting unit 140, etc.

Although, in the above embodiment, it has been explained that the link button to the product questionnaire is generated on the user's My Page when he registers the product, the present invention is not limited to this, and there may be a time difference between the user's product registration and the generation of the link button. As a first example, the operator of the My Page management server 100 may generate the question items of the questionnaire which do not specify individual products for the user in the questionnaire item database 105 by operating the edit inputting unit 140, separately from the product questionnaire corresponding to the user's product registration, and write the questionnaire ID 1520 of the questionnaire in the user information 1500 of the user who is expected to answer. If the operator wants the user who purchased any product within a specific period to answer the questionnaire, he may specify the user information 1500 in which the questionnaire ID 1520 should be written, by operating the edit inputting unit 140, searching the purchased product database 102 with the product purchase date 1603 as a key, specifying the purchased product information 1600 in which the purchase date 1603 within the above period is described, and further extracting the system user ID 1501.

Figure 24:
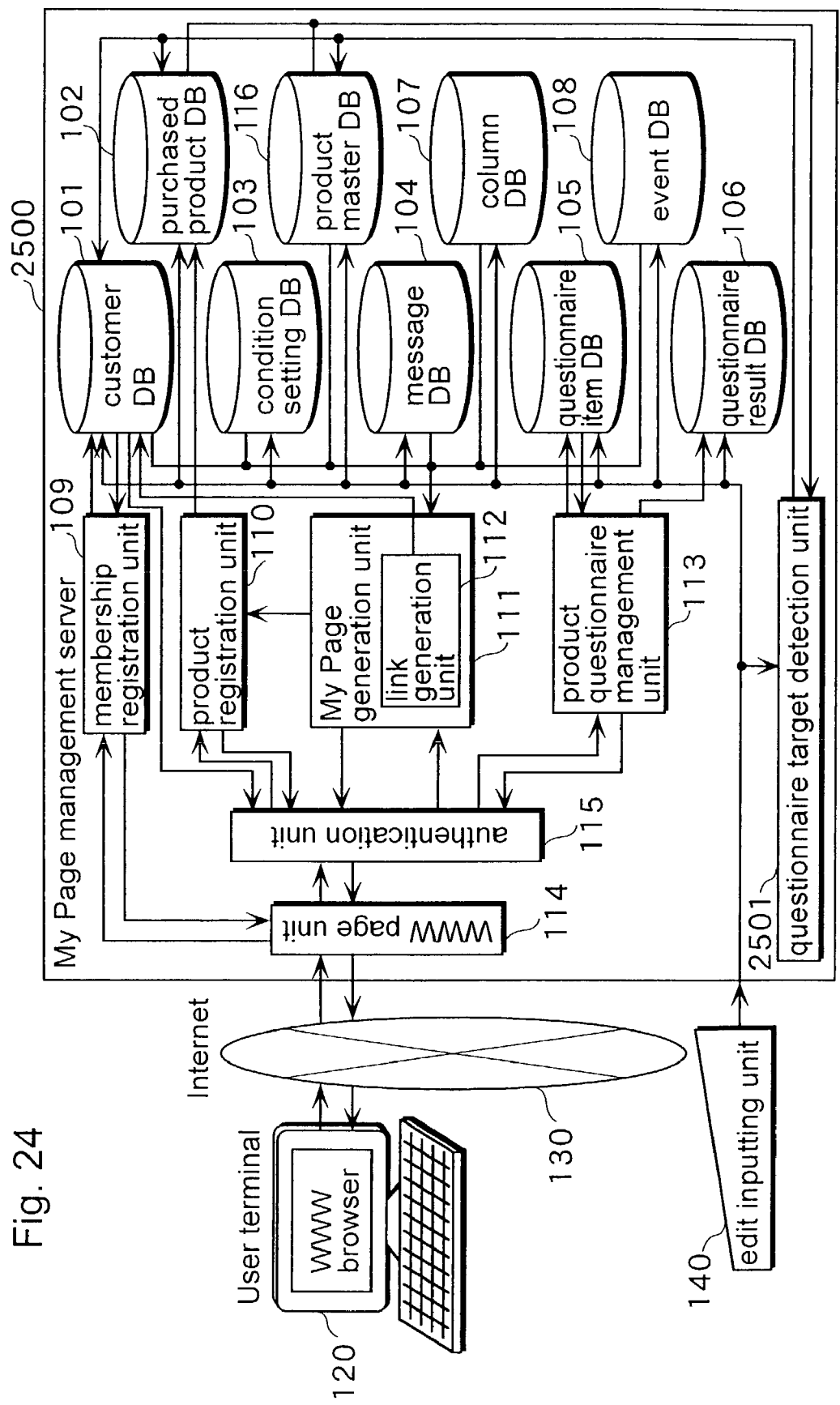
FIG. 24 is a block diagram that shows a structure of another My Page management server according to the present invention.

Also, as a second example, the operator of the My Page management server 100 may generate the link button to the product questionnaire in the above embodiment on the My Page after one month has passed since the purchase of the product, for example, instead of generating it just after the user's product registration. FIG. 24 is a block diagram that shows a structure of the other My Page management server 2500 according to the present invention. In this example, the My Page management server 2500 further includes a questionnaire target detection unit 2501 in addition to the components of the above-mentioned My Page management server 100. The questionnaire target detection unit 2501 is a processing unit that detects the user whom the product questionnaire should be sent and writes the questionnaire ID 1520 into the user information 1500 of the detected user. More specifically, the questionnaire target detection unit 2501 searches the purchased product database 102 at regular intervals, and specifies the purchased product information 1600 of the product whose purchase date 1603 is more than one month before the present date. The questionnaire target detection unit 2501 further extracts the system user ID 1501 and the product code 1601 corresponding to the purchase date 1603 from the specified purchased product information 1600. The questionnaire target detection unit 2501 searches the product master database 116 with the extracted product code 1601 as a key, reads out the questionnaire ID 1520 from the product master 2300 which is a hit with the search, and additionally writes the read-out questionnaire ID 1520 into the user information 1500 of the system user ID 1501 extracted from the purchased product information 1600. In this case, it goes without saying that the questionnaire target detection unit 2501 does not write the read-out questionnaire ID 1520 in the user information 1500 when the read-out questionnaire ID 1520 has already been written into the user information 1500.

Furthermore, as a third example, the operator of the My Page management server 100 has further generated the product questionnaire item which should be answered by the user who purchased the product more than one month ago in the questionnaire item database 105 using the edit inputting unit 140, separately from the product questionnaire which is desirable to be answered soon after the user's product registration, and additionally written the questionnaire ID in the product master database 116. FIG. 25 is a diagram that shows an example of the product master data 2400 including the questionnaire ID 2401 of the product questionnaire which is sent to the user who purchased the product more than one month ago. As shown in the figure, the product master 2400 is different from the product master 2300 as shown in FIG. 10 in that the former includes the item of the questionnaire ID 2401. The questionnaire ID of the product questionnaire in which the link button is generated when the user registers the product is described in the questionnaire ID 1520, and the questionnaire ID of the product questionnaire in which the link button is generated on the My Page of the user who purchased the product more than one month ago is described in the questionnaire ID 2401. Here, the questionnaire ID 2401 "A10861616" is described in the product master 2400 of the product code (product number) 1601 "DMC-F7", for example. The product questionnaire specified with the questionnaire ID 2401 "A10861616" is the product questionnaire for the user who purchased the product more than one month ago.

In this third example, the My Page management server 100 further includes a second questionnaire target detection unit (not shown in the figures) that detects the user to whom the product questionnaire should be sent, refers to the product master 2400 generated as mentioned above, and writes the questionnaire ID 2401 in the user information 1500 of the detected user. More specifically, the second questionnaire target detection unit searches the purchased product database 102 on a regular basis, as in the case of the above questionnaire target detection unit 2501, and specifies the purchased product information in which the purchase date 1603 that meets the above condition is described. Furthermore, the second questionnaire target detection unit extracts the system user ID 1501 and the product code 1601 corresponding to the purchase date 1603 from the specified purchased product information 1600, and searches the product master database 116 with the extracted product code 1601 as a key. As a result, the second questionnaire target detection unit reads out the questionnaire ID 2401 from the product master 2400 which is a hit with the search, and additionally writes the read-out questionnaire ID 2401 into the item of the questionnaire ID 1520 of the user information 1500 in which the system user ID 1501 extracted from the purchased product information 1600 is described. In this case, when the questionnaire ID 2401 identical to the read-out questionnaire ID 2401 has already been written in the user information 1500, the second questionnaire target detection unit does not additionally write the read-out questionnaire ID 1520 in. The link generation unit 112 generates a link button to each of the above-mentioned product questionnaires on the user's My Page based on the questionnaire ID 1520 and the questionnaire ID 2401 which are written in this user information 1500.

It has been explained in the above third example that the questionnaire ID 1520 and the questionnaire ID 2401 are written in the item of the questionnaire ID 1520 of the user information 1500. However, the item for the questionnaire ID 2401 may be added to the user information 1500 beforehand, or the upper two digits "A1" of the questionnaire ID 2401 "A10861616" may be referred so as to determine that it is the product questionnaire for the user who purchased the product more than one month ago. The second questionnaire target detection unit is not always necessary if the questionnaire ID 1520 can be distinguished from the questionnaire ID 2401 in the user information 1500, as mentioned above. For example, in the above first example, the operator additionally writes the questionnaire ID 2401 to the product master 2400 at the time when it creates the product questionnaire for the user who purchased the product more than one month ago. In response to this, the product registration unit 110 acquires both questionnaire IDs 1520 and 2401 on the same product from the product master 2400, and additionally writes them to the user information 1500, when the product is registered. At this time, the product registration unit 110 acquires the purchase date 1603 of the product, and attaches it to the questionnaire ID 2401. Thereby, the link generation unit 112 refers to the user information 1500 when it is started up by the My Page generation unit 111, and generates the link button to the product questionnaire specified with the questionnaire ID 1520 on the My Page for the user. Furthermore, the link generation unit 112 determines whether the date described in the purchase date 1603 which is attached to the questionnaire ID 2401 is more than one month before the present date or not. If so, it generates the link button to the product questionnaire specified with the questionnaire ID 2401 on the My Page, and if not, it does not generate the link button.

As described above, according to the present invention, there is an effect that link buttons to the product questionnaire corresponding to the product purchased by the user, any other pages and questionnaires and so on, can be automatically generated on the user's My Page in various manners at various points of time.

What is claimed is:

1. A product information management device that provides a personal world wide web (WWW) page for a user who has been registered as a member, the product information management device comprising:
    a product registration means for acquiring product registration data related to a product which the user purchased;
    a link generation means for generating and displaying, on the personal WWW page for the user, a web page link which is linked to a product questionnaire regarding the product which the user purchased, based on the acquired product registration data;
    a questionnaire presentation means for presenting the linked product questionnaire to the user, upon receiving a request for the product questionnaire from a terminal computer of the user via a network when the web page link which is generated and displayed on the personal WWW page for the user is executed;
    a clearing determination means for checking whether or not an answer to the presented product questionnaire linked to the personal WWW page and a user ID have been received from the user terminal computer, the user ID being identified by the product questionnaire being linked to the personal WWW page, and determining that a cause of clearing the web page link on the personal WWW page that corresponds to the user ID has occurred, upon receiving the answer to the presented product questionnaire and the user ID from the user terminal computer; and
    a link clearing means for clearing the web page link which is linked to the product questionnaire presented by said questionnaire presentation means, from the personal WWW page, when said clearing determination means determines that the cause of clearing the web page link has occurred.

2. A product information management method for providing a personal world wide web (WWW) page for a user who has been registered as a member, said product information management method comprising:
    acquiring product registration data related to a product which the user purchased;
    generating and displaying, on the personal WWW page for the user, a web page link which is linked to a product questionnaire regarding the product which the user purchased, based on the acquired product registration data;
    presenting the linked product questionnaire to the user, upon receiving a request for the product questionnaire from a terminal computer of the user via a network when the web page link which is generated and displayed on the personal WWW page for the user is executed;
    checking whether or not an answer to the presented product questionnaire linked to the personal WWW page and a user ID have been received from the user terminal computer, the user ID being identified by the product questionnaire being linked to the personal WWW page, and determining that a cause of clearing the web page link on the personal WWW page that corresponds to the user ID has occurred, upon receiving the answer to the presented product questionnaire and the user ID from the user terminal computer; and
    clearing the web page link which is linked to the presented product questionnaire from the personal WWW page, when it is determined in said determining that the cause of the clearing web page link has occurred.

* * * * *